US012225245B2

(12) United States Patent
Sodagar

(10) Patent No.: US 12,225,245 B2
(45) Date of Patent: *Feb. 11, 2025

(54) METHODS AND APPARATUS OF DISCOVERING FLUS NETWORK MEDIA PROCESSING CAPABILITIES USING 5G EDGE DATA NETWORK ARCHITECTURE

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/340,121

(22) Filed: Jun. 23, 2023

(65) Prior Publication Data
US 2023/0336791 A1 Oct. 19, 2023

Related U.S. Application Data

(63) Continuation of application No. 17/337,964, filed on Jun. 3, 2021, now Pat. No. 11,743,512.
(Continued)

(51) Int. Cl.
*H04N 21/2187* (2011.01)
*H04L 29/06* (2006.01)
(Continued)

(52) U.S. Cl.
CPC ......... *H04N 21/2187* (2013.01); *H04L 65/61* (2022.05); *H04N 21/2393* (2013.01); *H04N 21/254* (2013.01)

(58) Field of Classification Search
CPC ........... H04N 21/2187; H04N 21/2393; H04N 21/254; H04N 21/6156; H04N 21/242; H04L 65/61; H04L 65/1069; H04L 65/75
See application file for complete search history.

(56) References Cited

U.S. PATENT DOCUMENTS

2017/0236407 A1 8/2017 Rhoads et al.
2019/0394498 A1* 12/2019 Lo ..................... H04N 21/6405
(Continued)

OTHER PUBLICATIONS

Japanese Office Action dated Jun. 20, 2023 in Japanese Application No. 2022-527967.
(Continued)

*Primary Examiner* — Alazar Tilahun
(74) *Attorney, Agent, or Firm* — Sughrue Mion, PLLC

(57) ABSTRACT

Systems and methods for media processing and streaming are provided. A method includes receiving, by a first application operating on an application server, a live session request from a second application operating on a user device separate from the application server to start a Framework for Live Uplink Streaming (FLUS) session; obtaining a list of a plurality of FLUS sinks; selecting a FLUS media sink operating on a sink device from among the plurality of FLUS sinks, wherein the sink device is separate from the application server and the user device; sending a workflow request to a Network-Based Media Processing (NBMP) source to start an NBMP workflow associated with the FLUS media sink; and sending a response to the second application including session information for establishing the FLUS session using the NBMP workflow and the FLUS media sink.

20 Claims, 15 Drawing Sheets

Related U.S. Application Data

(60) Provisional application No. 63/066,703, filed on Aug. 17, 2020, provisional application No. 63/050,517, filed on Jul. 10, 2020.

(51) Int. Cl.
  *H04L 65/61* (2022.01)
  *H04N 21/239* (2011.01)
  *H04N 21/254* (2011.01)

(56) References Cited

U.S. PATENT DOCUMENTS

| | | | |
|---|---|---|---|
| 2020/0110633 A1 | 4/2020 | Kolan et al. | |
| 2020/0351449 A1 | 11/2020 | Oh | |
| 2020/0404069 A1* | 12/2020 | Li | H04L 67/59 |
| 2021/0007166 A1* | 1/2021 | Liao | H04W 48/16 |
| 2021/0075892 A1* | 3/2021 | Chun | H04L 69/163 |
| 2021/0105338 A1 | 4/2021 | Oyman | |
| 2021/0112439 A1* | 4/2021 | Leung | H04L 65/1069 |
| 2021/0320955 A1* | 10/2021 | Kolan | H04L 65/765 |
| 2021/0352114 A1* | 11/2021 | Lohmar | H04L 65/1069 |

OTHER PUBLICATIONS

Oyman et al., "Virtual Reality Industry Forum's View on State of the Immersive Media Industry", SMPTE Motion Imaging Journal, 2019, vol. 128, No. 8, (2 pages total).

Tencent, "Workflow example for FS_FLUS_NBMP", TSG SA4#108 Meeting, Tdoc S4-200549, Apr. 2-9, 2020, E-Meeting (11 pages total).

Written Opinion dated Sep. 24, 2021 from the International Bureau in International Application No. PCT/US21/38473.

International Search Report dated Sep. 24, 2021 from the International Searching Authority in International Application No. PCT/US21/38473.

ISO/IEC JTC1/SC29/WG11, "Coding of moving pictures and Audio: Text of ISO/IEC FDIS 23090-8 Network-based media processing", Jan. 2020, N19062, 105 total pages.

3GPP, "3rd Generation Partnership Project: Technical Specification Group Services and System Aspects; Uplink Streaming" 2020, 3GPP TS 26.238 V16.4.2, Release 16, 47 pages total.

3rd Generation Partnership Project; Technical Specification Group Services and System Aspects; Guidelines on the Framework for Live Uplink Streaming (FLUS); (Release 16); 3GPP TR 26.939 V16.1.0, Sep. 2019 (57 pages total).

Extended European Search Report dated Oct. 18, 2022 in European Application No. 21836957.7.

* cited by examiner

METHODS AND APPARATUS OF DISCOVERING FLUS NETWORK MEDIA PROCESSING CAPABILITIES USING 5G EDGE DATA NETWORK ARCHITECTURE

CROSS-REFERENCE TO RELATED APPLICATION

This application is a Continuation Application of U.S. application Ser. No. 17/337,964, filed on Jun. 3, 2021, which claims priority from U.S. Provisional Application No. 63/050,517, filed on Jul. 10, 2020, and U.S. Provisional Application No. 63/066,703, filed on Aug. 17, 2020, in the United States Patent & Trademark Office, the disclosures of which are incorporated herein by reference in their entireties.

FIELD

Embodiments of this disclosure are directed to media processing and streaming methods and systems, more particularly to Moving Picture Experts Group (MPEG) Network-Based Media Processing (NBMP) and Framework for Live Uplink Streaming (FLUS) methods and systems.

BACKGROUND

Moving Picture Experts Group (MPEG) Network-Based Media Processing (NBMP) project has developed a concept of processing media on the cloud. "Text of ISO/IEC DIS 23090-8 Network-based Media Processing", ISO/IEC JTC 1/SC 29/WG 11 (N 18657), dated Jul. 12, 2019, is incorporated herein in its entirety.

3rd Generation Partnership Project (3GPP) Framework for Live Uplink Streaming (FLUS) protocol provides a mechanism for uplink streaming of multimedia content from a source device to a network and sending/distributing that content to one or more destinations. "3rd Generation Partnership Project; Technical Specification Group Services and System Aspects; Uplink Streaming (Release 16)", 3GPP TS 26.238 V16.2.0, dated September 2019, is incorporated herein in its entirety.

3GPP edge protocol defines the general architecture for enabling edge application, including the discovery of hardware capabilities of an edge element. "3rd Generation Partnership Project; Technical Specification Group Services and System Aspects; Architecture for enabling Edge Applications (Release 17)", 3GPP TS 23.558 V0.3.0, dated June 2020, is incorporated herein in its entirety.

SUMMARY

According to one or more embodiments, a method for processing media content in Moving Picture Experts Group (MPEG) Network Based Media Processing (NBMP) is provided. The method includes: receiving, by a first application operating on an application server, a live session request from a second application operating on a user device separate from the application server to start a Framework for Live Uplink Streaming (FLUS) session; obtaining a list of a plurality of FLUS sinks; selecting a FLUS media sink operating on a sink device from among the plurality of FLUS sinks, wherein the sink device is separate from the application server and the user device; sending a workflow request to an NBMP source to start an NBMP workflow associated with the FLUS media sink; and sending a response to the second application including session information for establishing the FLUS session using the NBMP workflow and the FLUS media sink.

According to one or more embodiments, an apparatus for processing media content in Moving Picture Experts Group (MPEG) Network Based Media Processing (NBMP) is provided. The apparatus includes at least one memory configured to store program code; and at least one processor configured to read the program code and operate as instructed by the program code, the program code including: receiving code configured to cause the at least one processor to receive, by a first application operating on an application server, a live session request from a second application operating on a user device separate from the application server to start a Framework for Live Uplink Streaming (FLUS) session; obtaining code configured to cause the at least one processor to obtain a list of a plurality of FLUS sinks; selecting code configured to cause the at least one processor to select a FLUS media sink operating on a sink device from among the plurality of FLUS sinks, wherein the sink device is separate from the application server and the user device; first sending code configured to cause the at least one processor to send a workflow request to an NBMP source to start an NBMP workflow associated with the FLUS media sink; and second sending code configured to cause the at least one processor to send a response to the second application including session information for establishing the FLUS session using the NBMP workflow and the FLUS media sink.

According to one or more embodiments, a non-transitory computer-readable medium storing computer instructions is provided. The computer instructions are configured to, when executed by at least one processor of a device for processing media content in Moving Picture Experts Group (MPEG) Network Based Media Processing (NBMP), cause the at least one processor to: receive, by a first application operating on an application server, a live session request from a second application operating on a user device separate from the application server to start a Framework for Live Uplink Streaming (FLUS) session; obtain a list of a plurality of FLUS sinks; select a FLUS media sink operating on a sink device from among the plurality of FLUS sinks, wherein the sink device is separate from the application server and the user device; send a workflow request to an NBMP source to start an NBMP workflow associated with the FLUS media sink; and send a response to the second application including session information for establishing the FLUS session using the NBMP workflow and the FLUS media sink.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
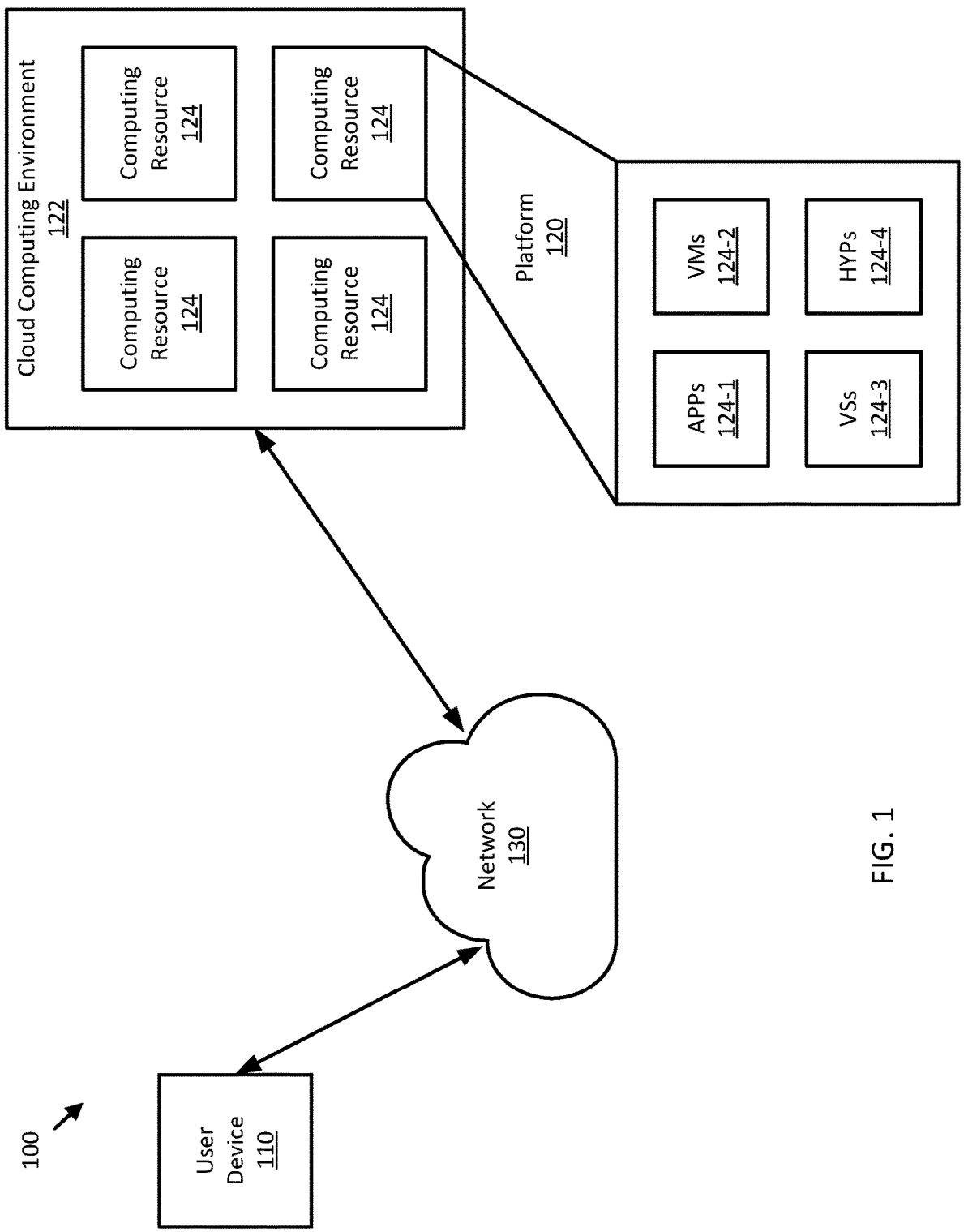
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
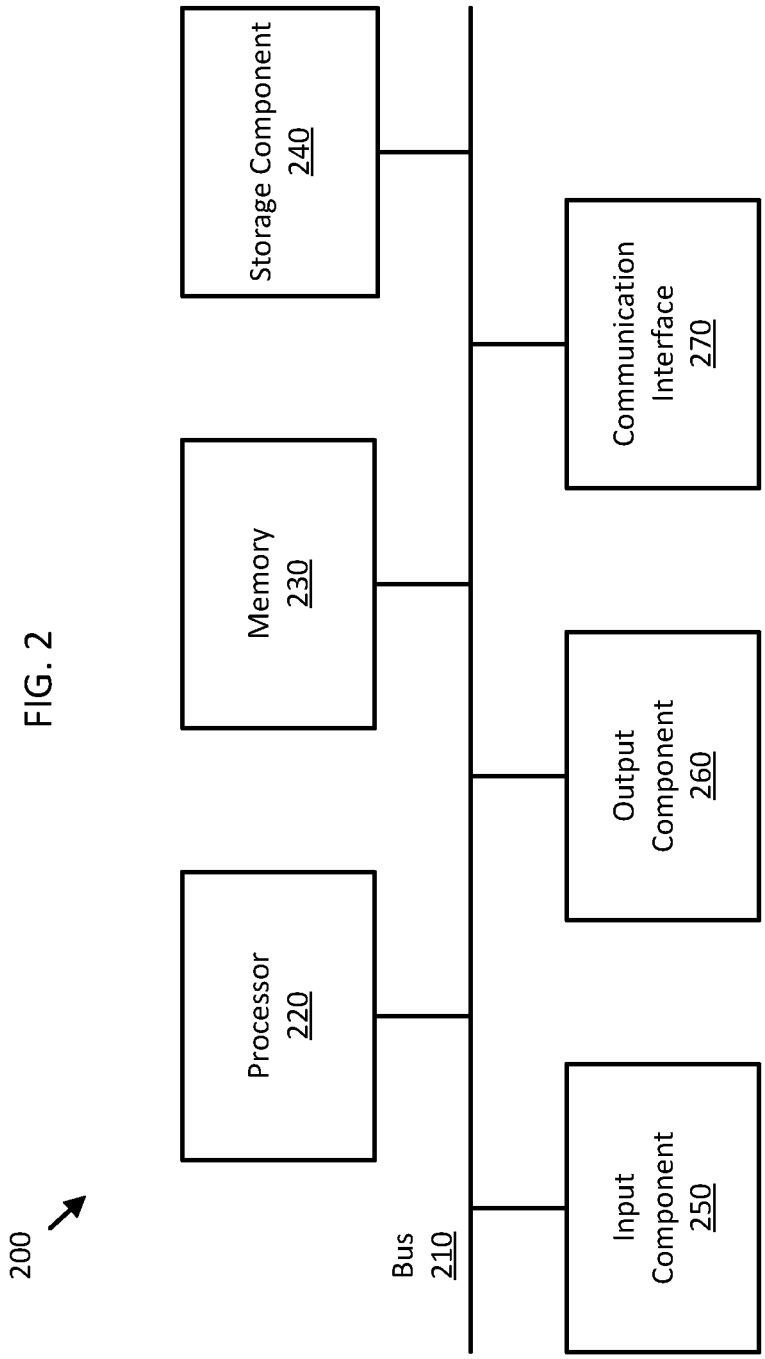
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
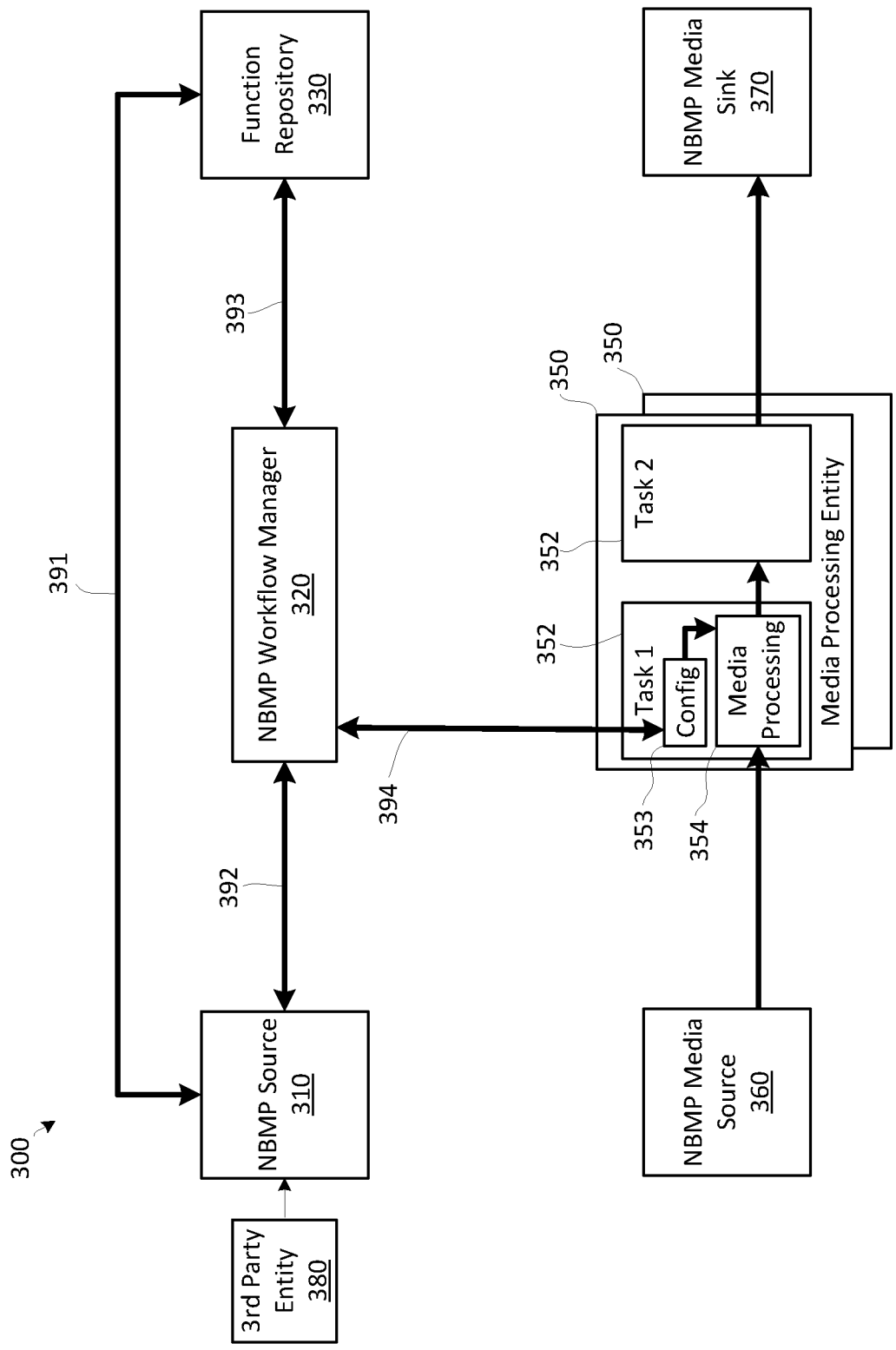
FIG. 3 is a block diagram of an NBMP system, according to embodiments.

In an embodiment of the present disclosure, an NBMP system 300 is provided. With reference to FIG. 3, the NBMP system 300 may include an NBMP source 310, an NBMP workflow manager 320, a function repository 330, one or more media processing entities 350, a media source 360, and a media sink 370.

The NBMP source 310 may receive instructions from a third party entity 380, may communicate with the NBMP workflow manager 320 via an NBMP workflow API 392, and may communicate with the function repository 330 via a function discovery API 391. For example, the NBMP source 310 may send a workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP source 310 may include or be implemented by at least one processor and memory that stores code configured to cause the at least processor to perform the functions of the NBMP source 310.

The NBMP source 310 may request the NBMP workflow manager 320 to create workflow including tasks 352 to be performed by the one or more media processing entities 350 by sending the workflow description document, which may include several descriptors, each of which may have several parameters.

For example, the NBMP source 310 may select functions stored in the function repository 330 and send the workflow description document to the NBMP workflow manager 320 that includes a variety of descriptors for description details such as input and output data, required functions, and requirements for the workflow. The workflow description document may include a set of task descriptions and a connection map of inputs and outputs of tasks 352 to be performed by one or more of the media processing entities 350. When the NBMP workflow manager 320 receives such information from the NBMP source 310, the NBMP workflow manager 320 may create the workflow by instantiating the tasks based on function names and connecting the tasks in accordance with the connection map.

Alternatively or additionally, the NBMP source 310 may request the NBMP workflow manager 320 to create workflow by using a set of keywords. For example, NBMP source 310 may send the NBMP workflow manager 320 the workflow description document that may include a set of keywords that the NBMP workflow manager 320 may use to find appropriate functions stored in the function repository 330. When the NBMP workflow manager 320 receives such information from the NBMP source 310, the NBMP workflow manager 320 may create the workflow by searching for appropriate functions using the keywords that may be specified in a Processing Descriptor of the workflow description document, and use the other descriptors in the workflow description document to provision tasks and connect them to create the workflow.

The NBMP workflow manager 320 may communicate with the function repository 330 via a function discovery API 393, which may be a same or different API from the function discovery API 391, and may communicate with one or more of the media processing entities 350 via an NBMP task API 394. The NBMP workflow manager 320 may include or be implemented by at least one processor and memory that stores code configured to cause the at least processor to perform the functions of the NBMP workflow manager 320.

The NBMP workflow manager 320 may use the NBMP task API 394 to setup, configure, manage, and monitor one or more tasks 352 of a workflow that is performable by the one or more media processing entities 350. In an embodiment, the NBMP workflow manager 320 may use the NBMP task API 394 to update and destroy the tasks 352. In order to configure, manage, and monitor tasks 352 of the workflow, the NBMP workflow manager 320 may send messages, such as requests, to one or more of the media processing entities 350, wherein each message may have several descriptors, each of which have several parameters. The tasks 352 may each include media processing functions 354 and configurations 353 for the media processing functions 354.

In an embodiment, after receiving a workflow description document from the NBMP source 310 that does not include a list of the tasks (e.g. includes a list of keywords instead of a list of tasks), the NBMP workflow manager 320 may select the tasks based on the descriptions of the tasks in the workflow description document to search the function repository 330, via the function discovery API 393, to find the appropriate functions to run as tasks 352 for a current workflow. For example, the NBMP workflow manager 320 may select the tasks based on keywords provided in the workflow description document. After the appropriate functions are identified by using the keywords or the set of task descriptions that is provided by the NBMP source 310, the NBMP workflow manager 320 may configure the selected tasks in the workflow by using the NBMP task API 394. For example, the NBMP workflow manager 320 may extract configuration data from information received from the NBMP source, and configure the tasks 352 based on the configuration data.

The one or more media processing entities 350 may be configured to receive media content from the media source 360, process the media content in accordance with the workflow, that includes tasks 350, created by the NBMP workflow manager 320, and output the processed media content to the media sink 370. The one or more media processing entities 350 may each include or be implemented by at least one processor and memory that stores code configured to cause the at least processor to perform the functions of the media processing entities 350.

The media source 360 may include memory that stores media and may be integrated with or separate from the NBMP source 310. In an embodiment, the NBMP workflow manager 320 may notify the NBMP source 310 when a workflow is prepared and the media source 360 may transmit media content to the one or more of the media processing entities 350 based on the notification that the workflow is prepared.

The media sink 370 may include or be implemented by at least one processor and at least one display that is configured to display the media that is processed by the one or more media processing entities 350.

The third party entity 380 may include or be implemented by at least one processor and memory that stores code configured to cause the at least processor to perform the functions of the third party entity 380.

As discussed above, messages from the NBMP Source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include several descriptors, each of which may have several parameters. In cases, communication between any of the components of the NBMP system 300 using an API may include several descriptors, each of which may have several parameters.

Figure 4:
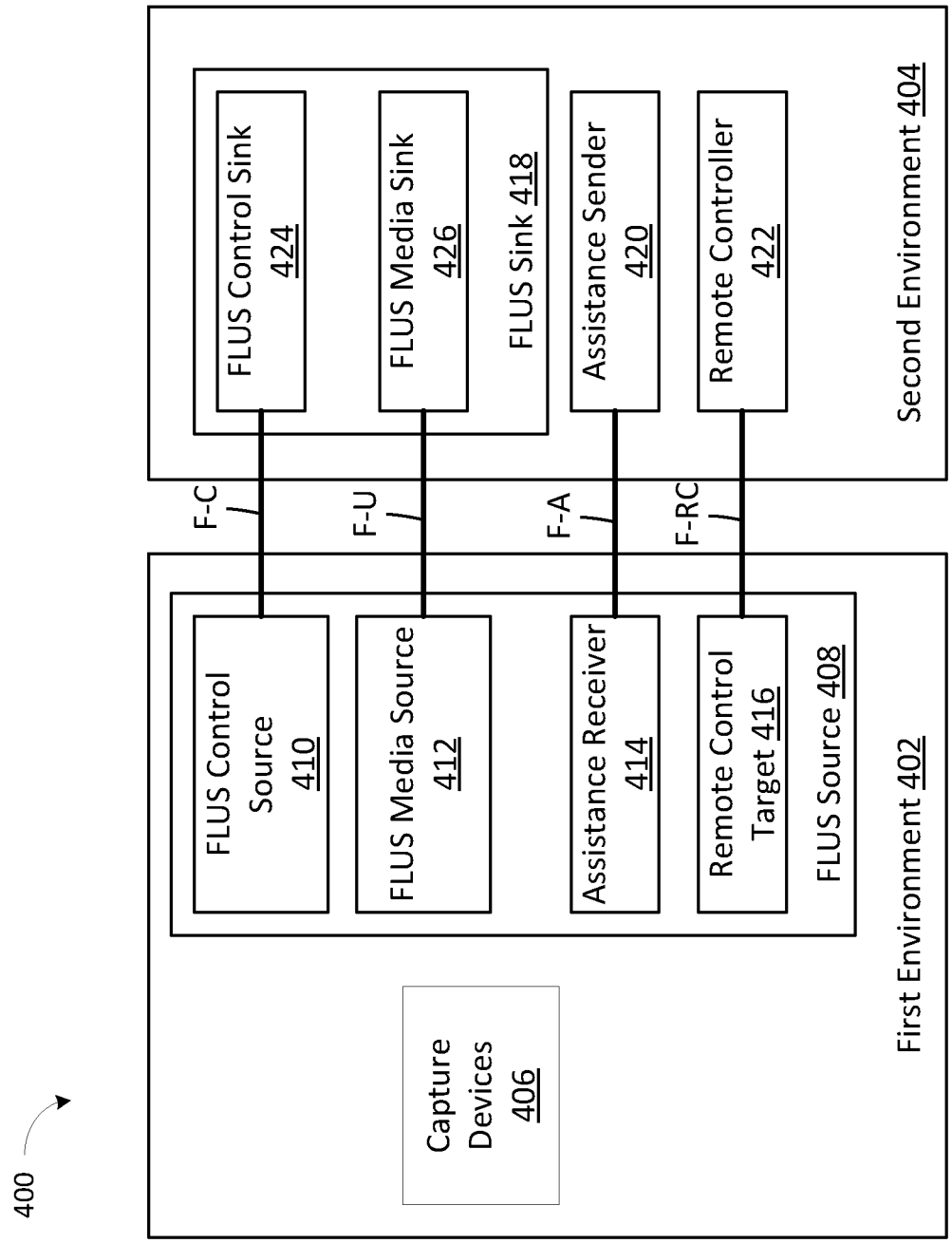
FIG. 4 is a block diagram of a 3GPP FLUS architecture, according to embodiments.

Referring now to FIG. 4, a block diagram of a 3GPP FLUS architecture 400 of an embodiment of the present disclosure is depicted. The 3GPP FLUS architecture 400 may include a first environment 402 (e.g. a user environment that includes one or more user devices) and a second environment 404 (e.g. a user environment or a network). The first environment 402 may include one or more capture devices 406 and a FLUS source 408. The FLUS source 408 may include a control source 410, a media source 412, an assistance receiver 414, and a remote control target 416. The second environment 404 may include a FLUS sink 418, an assistance sender 420, and a remote controller 422. The FLUS sink 418 may include a control sink 424 and a media sink 426.

Any number of the capture devices 406, control source 410, media source 412, assistance receiver 414, and remote control target 416 may be implemented by a same or different at least one processor and memory, storing computer instructions, of the first environment 402. Also, any number of the control sink 424, media sink 426, assistance sender 420, and remote controller 422 may be implemented by a same or different at least one processor and memory, storing computer instructions, of the second environment 404.

Communication between the first environment 402 and the second environment 404 may be provided by, for example, a network. For example, the communication may be provided via an F-C link, an F-U link, an F-A link, and an F-RC link, which may be for example APIs. The F-C link may represent end points of a communication route between the control source 410 and the control sink 424. The F-U link may represent end points of a communication route between the media source 412 and the media sink 426. The F-A link may represent end points of a communication route between the assistance receiver 414 and the assistance sender 420. The F-RC link may represent end points of a communication route between the remote control target 416 and the remote controller 422.

The FLUS source 408 may receive media content from one or more of the capture devices 406 within the first environment 402, or connected to the first environment, and forward the media content to the FLUS sink 426. The FLUS sink 426 may forward the media content to a decoding and rendering function and/or to a processing or distribution sub-function within the second environment 404.

The control source 410 may control, via the F-C link, the control sink 424 to process received media content for subsequent downstream distribution, and may select FLUS media instantiation. The F-C link may represent interactions associated with the creation and modification of the configuration of the FLUS sink 418. For example, the F-C link may allow the control source 410 to select a FLUS media instantiation, provide static metadata associated with each media session present in the FLUS session, and select and configure the processing and distribution sub-functions.

The media source 412 and the media sink 426 may, using the F-U link, set up one or more media sessions and subsequent media data transmissions via media streams. FLUS media instantiation may be defined as part of a FLUS session. Multiple media streams may be established for one FLUS session. A media stream may contain media components of one or more media content types (e.g. audio and/or video). A FLUS session may be composed of one or more media streams containing, for example, the same content type (e.g. multiple media streams of video).

The assistance sender 420 may send, via the F-A link, assistance messages to the assistance receiver 414. The FLUS source 408 may be configured to alter behavior of the FLUS media function (e.g. media sending behavior of the media source) within the FLUS source 408 based on the assistance messages. Assist information within assist messages may pertain to, for example, network related conditions, viewership or engagement information from content recipients, or user preference data. An example recommendation issued by the assistance receiver 414 to the media source 412 may be to only upload the first 5 seconds of video to the FLUS sink 418, due to current absence of viewership of live uplink streaming content.

The remote controller 422 may send, via the F-RC link, control messages to the remote control target 416. The control messages may include commands such as, for example, to start or stop a media upstreaming process in the FLUS source 408. The FLUS source 408 may be configured to alter behavior of the media source 412 based on the control messages. The remote controller 422 may, via the F-U link, provide media sink information to the FLUS source 408, select a FLUS media instantiation, and determine capture device settings and other FLUS source parameters.

Embodiments may relate to various scenarios to deploy NBMP with 5G FLUS. Embodiments may provide a general architecture and its variations, as well as an example call flow for each scenario.

As discussed above, In NBMP standard, the NBMP Source is the entity providing the workflow description to Workflow Manager to create, run, manage and monitor a media workflow. The interaction between NBMP Source and Workflow Manager is through a set of NBMP Operation APIs. In the case of the 3GPP FLUS protocol, the source device of media streams establishes an uplink session with a Sink through the network. The FLUS APIs allows the source device to control the session and also the Sink to provide feedback or remote control of the source device.

The current 3GPP FLUS protocol supports including NBMP Workflow Description Document (WDD) as part of the session control update by the source device. However, it does not include the actual deployment scenarios for use of NBMP with 5G FLUS.

Figure 5:
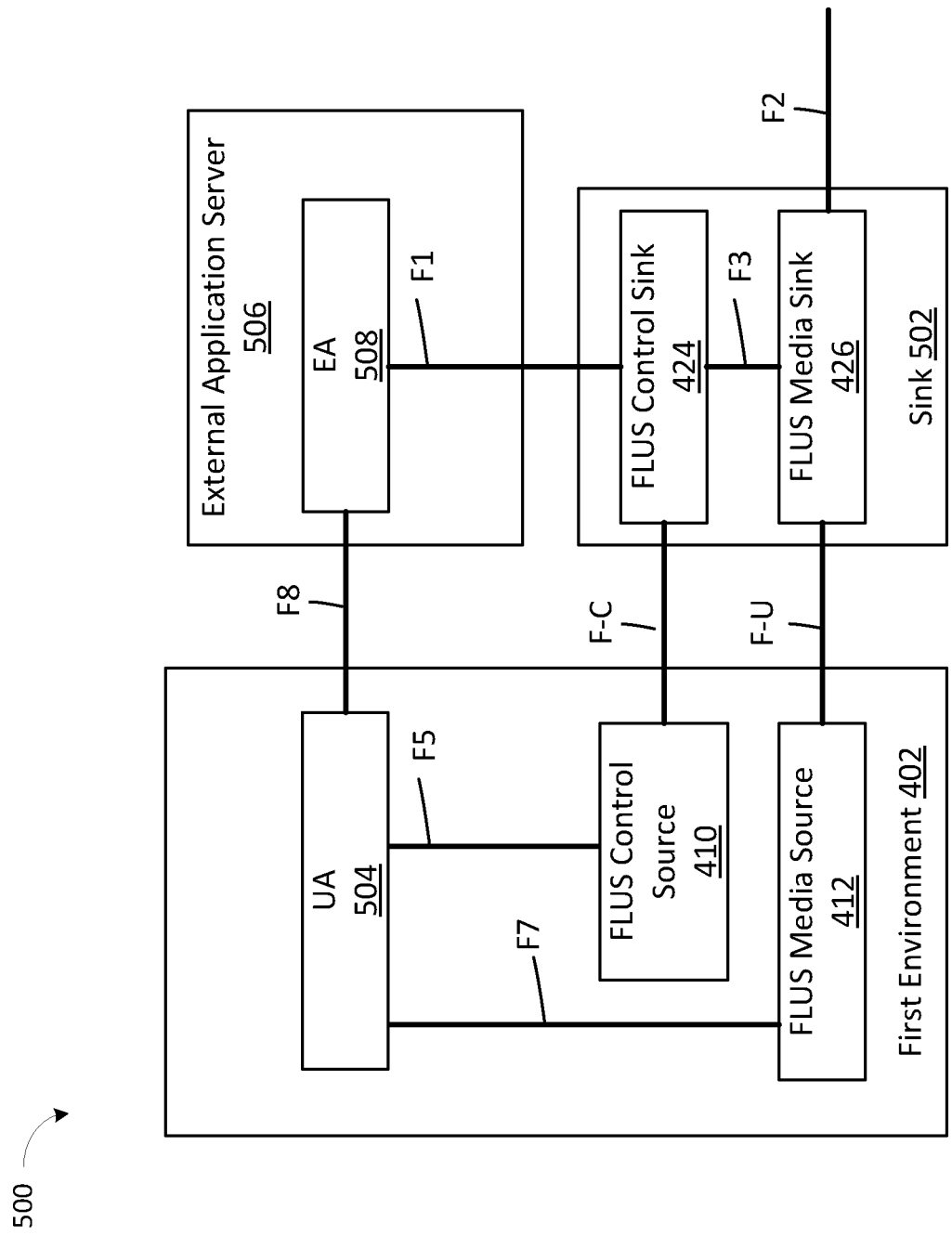
FIG. 5 is a block diagram of a network architecture, according to embodiments.

For deployment of NBMP with FLUS, embodiments may extend the architectures discussed above. For example, FIG. 5 illustrates an embodiment of an architecture 500, which extends architecture 400 by including an application UA 504 in first environment 402, by including FLUS control sink 424 and FLUS media sink 426 in sink 502, which may be a sink device, and by including an application EA 508 in an external application server 506 in communication with first environment 402 and sink 502. In order to avoid unnecessary duplication, redundant description has been omitted.

In addition, architecture 500 shows link F1, link F2, link F3, link F5, and link F7, which may be for example APIs. As can be seen in FIG. 5, link F1 may represent end points of a communication route between application EA 508 and FLUS control sink 424. Link F2 may represent end points of a communication route between FLUS media sink 426 and other elements or devices. Link F3 may represent end points of a communication route between FLUS control sink 424 and FLUS media sink 426. Link F5 may represent end points of a communication route between FLUS control source 410 and application UA 504. Link F7 may represent end points of a communication route between FLUS media source 412 and application US 504. Link F8 may represent end points of a communication route between application EA 508 and application UA 504

FIGS. 6-10 illustrate different deployment scenarios based on the general architecture of FIG. 5.

Figure 6:
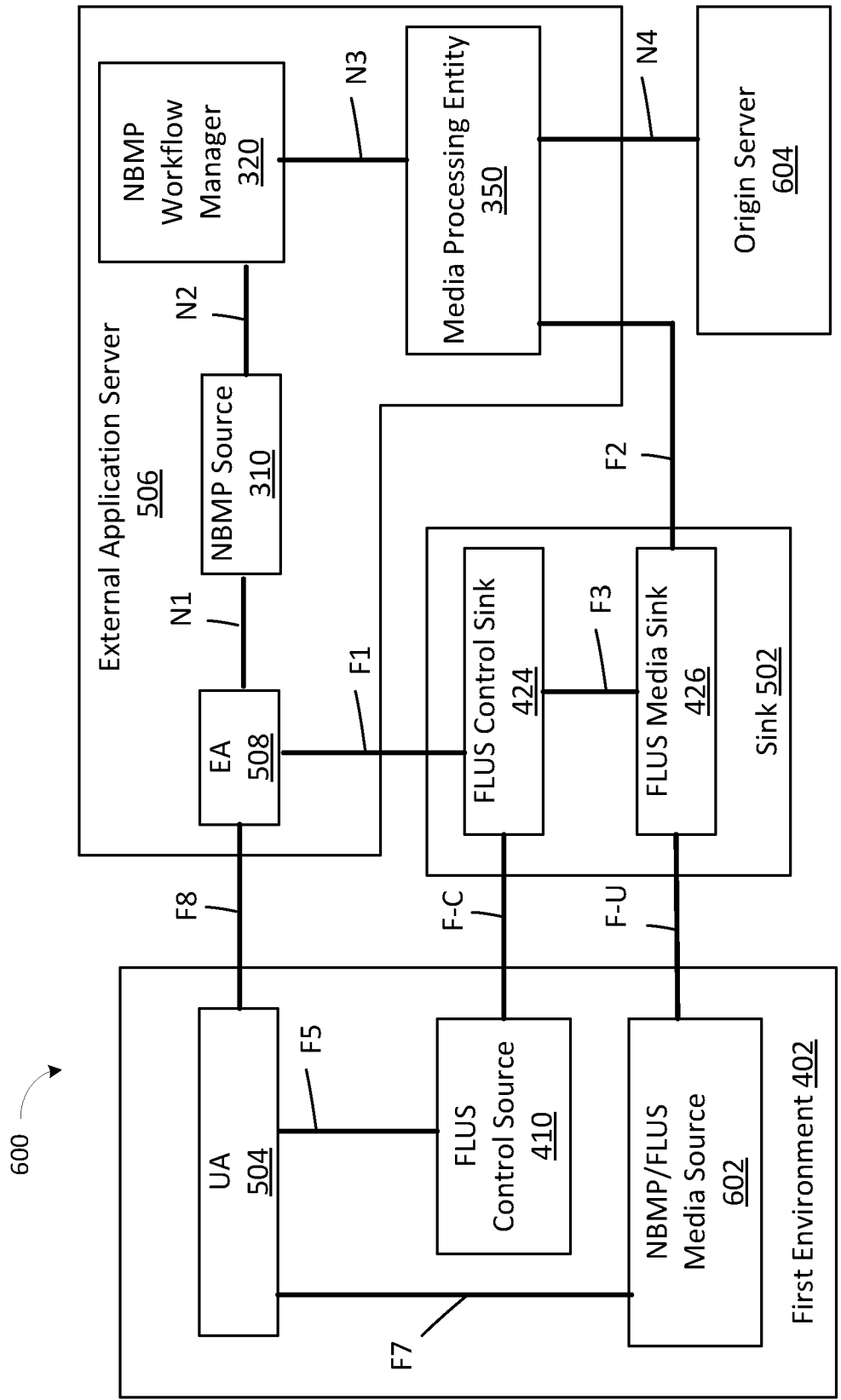
FIG. 6 is a block diagram of a network architecture, according to embodiments.

FIG. 6 illustrates an architecture 600 in which elements from architecture 500 of FIG. 5 are combined with elements from architecture 300 of FIG. 3. In order to avoid unnecessary duplication, redundant description has been omitted. As can be seen in FIG. 6, in architecture 600, external application server 506 includes NBMP source 310, NBMP workflow manager 320, and media processing entity 350. In addition, as can be seen in FIG. 6, architecture 600 includes NBMP/FLUS media source 602, which may correspond to one or more of NBMP media source 360 and FLUS media source 412, and origin server 604, which may correspond to NBMP media sink 370. In addition, in embodiments application EA 508 may correspond to third party entity 380, link N1 may represent end points of a communication route between application EA 508 and NBMP source 310, link N2 may correspond to NBMP workflow API 392, and link N3 may correspond to NBMP task API 394.

Referring to FIG. 6, an example of steps of establishing, operating, and tearing down a FLUS-NBMP session using architecture 600 may proceed as follows:

1. Application UA 504 makes a request through link F8 to application EA 508 to start a live session.
2. Application EA 508 requests a list of FLUS Sinks from a Sink Discovery Server (not shown).
3. Sink Discovery Server responds to application EA 508 request.
4. Application EA 508 picks a Sink 502 and finds its FLUS Media Sink 426 address.
5. Application EA 508 retrieves the user profile and identifies the resources needed to run the service.
6. Application EA 508 requests NBMP Source 310 to start an NBMP Workflow.
7. NBMP Source 310 builds the WDD, and requests NBMP Workflow Manager 320 to instantiate the Workflow.
8. NBMP Workflow Manager 320 discovers various MPEs and finds enough number of MPEs to run the workflow
9. NBMP Workflow Manager 320 instantiates the workflow.
10. NBMP Workflow Manager 320 responds to NBMP Source 310 with updated WDD.
11. NBMP Source 310 acknowledge workflow instantiation to application EA 508.
12. Application EA 508 responds to Application UA 504 with Sink Control information and Media Sink information.
13. Application UA 504 requests FLUS Control Source 410 to establish the FLUS session.
14. FLUS Control Source 410 establishes the FLUS session and acknowledges application UA 504.
15. Application UA 504 start ingesting the content.
16. The session runs
17. Application UA 504 requests application EA 508 to end the session.
18. Application EA 508 requests NBMP Source 310 to stop the NBMP workflow.
19. NBMP Source 310 acknowledge s the stopping of the NBMP session.
20. Application EA 508 acknowledges application UA 504 the stopping of the workflow.
21. Application UA 504 requests FLUS Control Sink 424 to stop the FLUS session.

Table 1 shows the required standard interfaces in the scenario of FIG. 6:

TABLE 1

Required Standard APIs for NBMP in Application Server

| Standard | FLUS | F-C, F-U, F1 |
|---|---|---|
|  | NBMP | N4, F2 |

Figure 7:
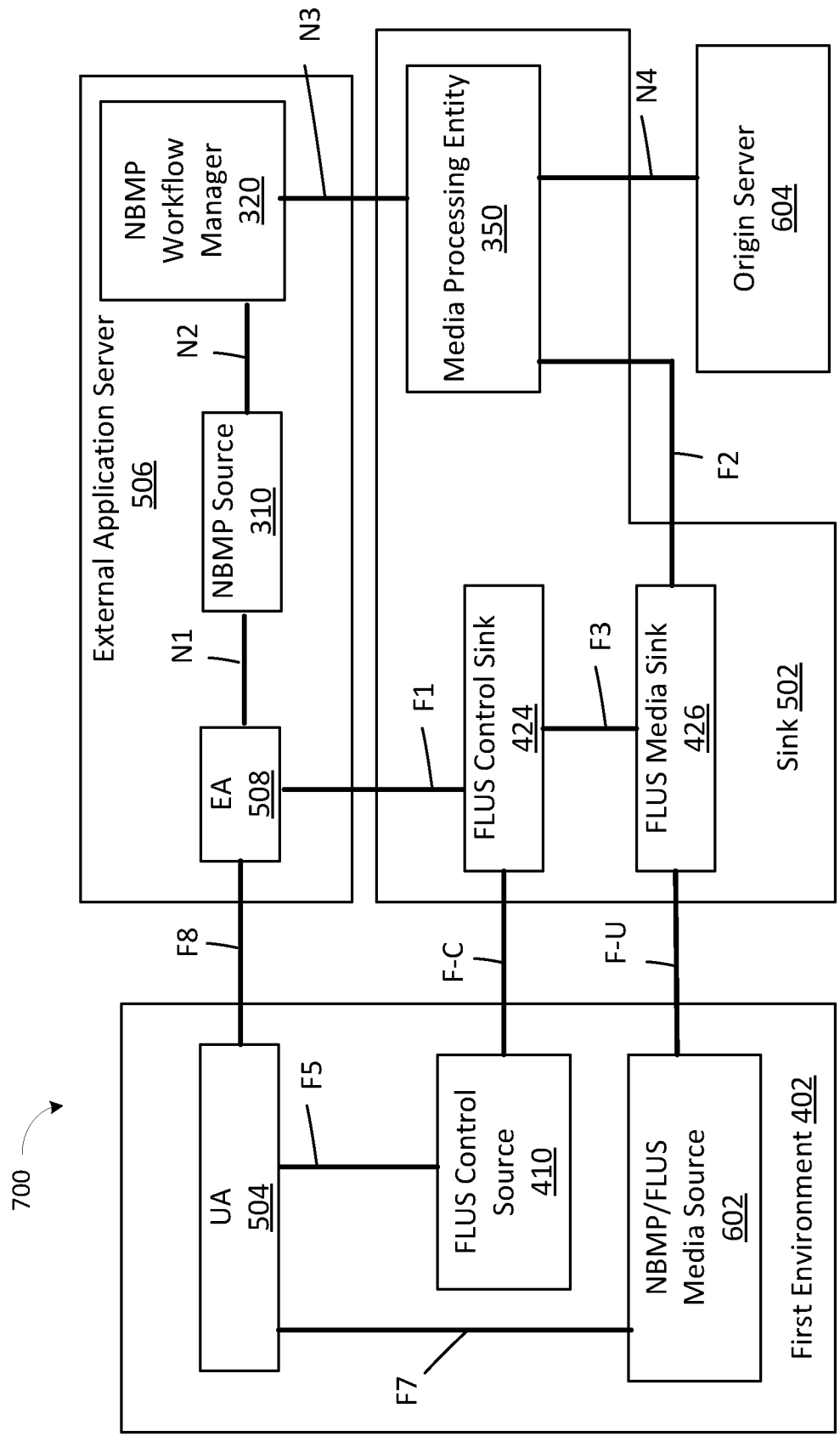
FIG. 7 is a block diagram of a network architecture, according to embodiments.

FIG. 7 illustrates an architecture 700 in which elements from architecture 500 of FIG. 5 are combined with elements from architecture 300 of FIG. 3. In order to avoid unnecessary duplication, redundant description has been omitted. As can be seen in FIG. 7, in architecture 700, external application server 506 includes NBMP source 310 and NBMP workflow manager 320, and sink 502 includes media processing entity 350.

Referring to FIG. 7, an example of steps of establishing, operating, and tearing down a FLUS-NBMP session using architecture 700 may proceed as follows:

1. Application UA 504 makes a request through link F8 to application EA 508 to start a live session.
2. Application EA 508 retrieves the user profile and identifies the resources needed to run the service.
3. Application EA 508 requests the list of FLUS Sinks and their capabilities from Sink Discovery Server (not shown).
4. Application EA 508 picks Sink 502 that can run the workflow in its MPE 350 and find its MPE address and MPE APIs in its capabilities.
5. Application EA 508 requests NBMP Source 310 to start an NBMP Workflow with FLUS Media Sink 426 Address.
6. NBMP Source 310 builds the WDD, and requests NBMP Workflow Manager 320 to instantiate the Workflow, with the assigned MPE 350.
7. NBMP Workflow Manager 320 instantiates the workflow in the assigned MPE 350.
8. NBMP Workflow Manager 320 responds to NBMP Source 310 with updated WDD.
9. NBMP Source 310 acknowledges workflow instantiation to application EA 508.
10. Application EA 508 responds to application UA 504 with Sink Control and Media Sink information.
11. Application UA 504 requests FLUS Control Source 410 to establish the FLUS session
12. FLUS Control Source 410 establishes the FLUS session and acknowledges application UA 504
13. Application UA 504 start ingesting the content.
14. The session runs
15. Application UA 504 requests application EA 508 to end the session.
16. Application EA 508 request NBMP Source 310 to stop the NBMP workflow.
17. NBMP Source 310 acknowledges the stopping of the NBMP session.
18. Application EA 508 acknowledges application UA 504 the stopping of the workflow.
19. Application UA 504 requests FLUS Control Sink 424 to stop the FLUS session.

In the above, italicized text illustrates differences in the call-flow from the previous scenario.

Table 2 shows the required standard interfaces in scenario of FIG. 7:

TABLE 2

Required Standard APIs for NBMP in Application Server, MPE in Sink

| Standard | FLUS | F-C, F-U, F1 |
|---|---|---|
|  | NBMP | N4, N3* |

*N3 may be a closed API implemented by the application provider-operator agreement.

Figure 8:
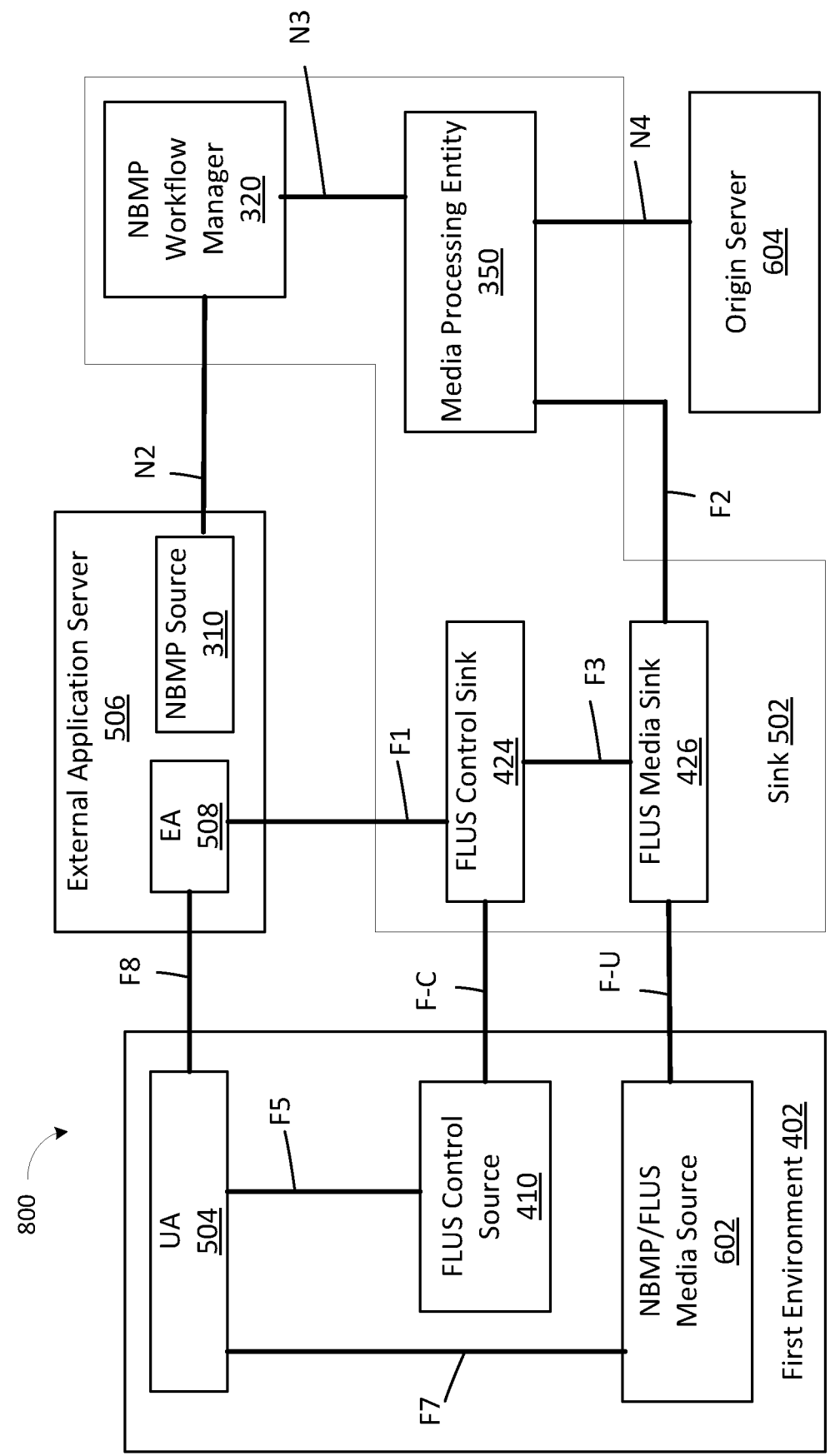
FIG. 8 is a block diagram of a network architecture, according to embodiments.

FIG. 8 illustrates an architecture 800 in which elements from architecture 500 of FIG. 5 are combined with elements from architecture 300 of FIG. 3. In order to avoid unnecessary duplication, redundant description has been omitted. As can be seen in FIG. 8, in architecture 800, external application server 506 includes NBMP source 310, and sink 502 includes media processing entity 350 and NBMP workflow manager 320.

Referring to FIG. 8, an example of steps of establishing, operating, and tearing down a FLUS-NBMP session using architecture 800 may proceed as follows:

1. Application UA 504 makes a request through link F8 to application EA 508 to start a live session.
2. Application EA 508 retrieves the user profile and identifies the resources needed to run the service.
3. Application EA 508 requests the list of FLUS Sinks and their capabilities from Sink Discovery Server (not shown).
4. Application EA 508 picks a Sink 502 that can run the workflow in its MPE 350 and find its NBMP Workflow Manager 320 and FLUS Media Sink 426 address in the Sink capabilities.
5. Application EA 508 requests NBMP Source 310 to start an NBMP Workflow with FLUS Media Sink 426 Address.
6. NBMP Source builds the WDD, and requests NBMP Workflow Manager 320 to instantiate the Workflow, with the assigned MPE 350.
7. NBMP Workflow Manage 320r instantiates the workflow in the assigned MPE 350.
8. NBMP Workflow Manager 320 responds to NBMP Source 310 with updated WDD.
9. NBMP Source 310 acknowledges workflow instantiation to application EA 508.
10. Application EA 508 responds to application UA 504 with Sink Control and Media Sink information.
11. Application UA 504 requests FLUS Control Source 410 to establish the FLUS session
12. FLUS Control Source 410 establishes the FLUS session and acknowledges application UA 504
13. UA start ingesting the content.
14. The session runs
15. Application UA 504 requests application EA 508 to end the session.
16. Application EA 508 request NBMP Source 310 to the stopping of the NBMP workflow.
17. NBMP Source 310 acknowledges the stopping of the NBMP session.
18. Application EA 508 acknowledges application UA 504 the stop of the workflow.
19. Application UA 504 requests FLUS Control Sink 424 to stop the FLUS session.

In the above, italicized text illustrates differences in the call-flow from the previous scenarios.

Table 3 shows the required standard interfaces in the scenario of FIG. 8:

TABLE 3

| NBMP Source in Application Server, NBMP Workflow Manager and MPE in Sink | | |
|---|---|---|
| Standard | FLUS | F-C, F-U, F1 |
| | NBMP | N2, N4 |

Figure 9:
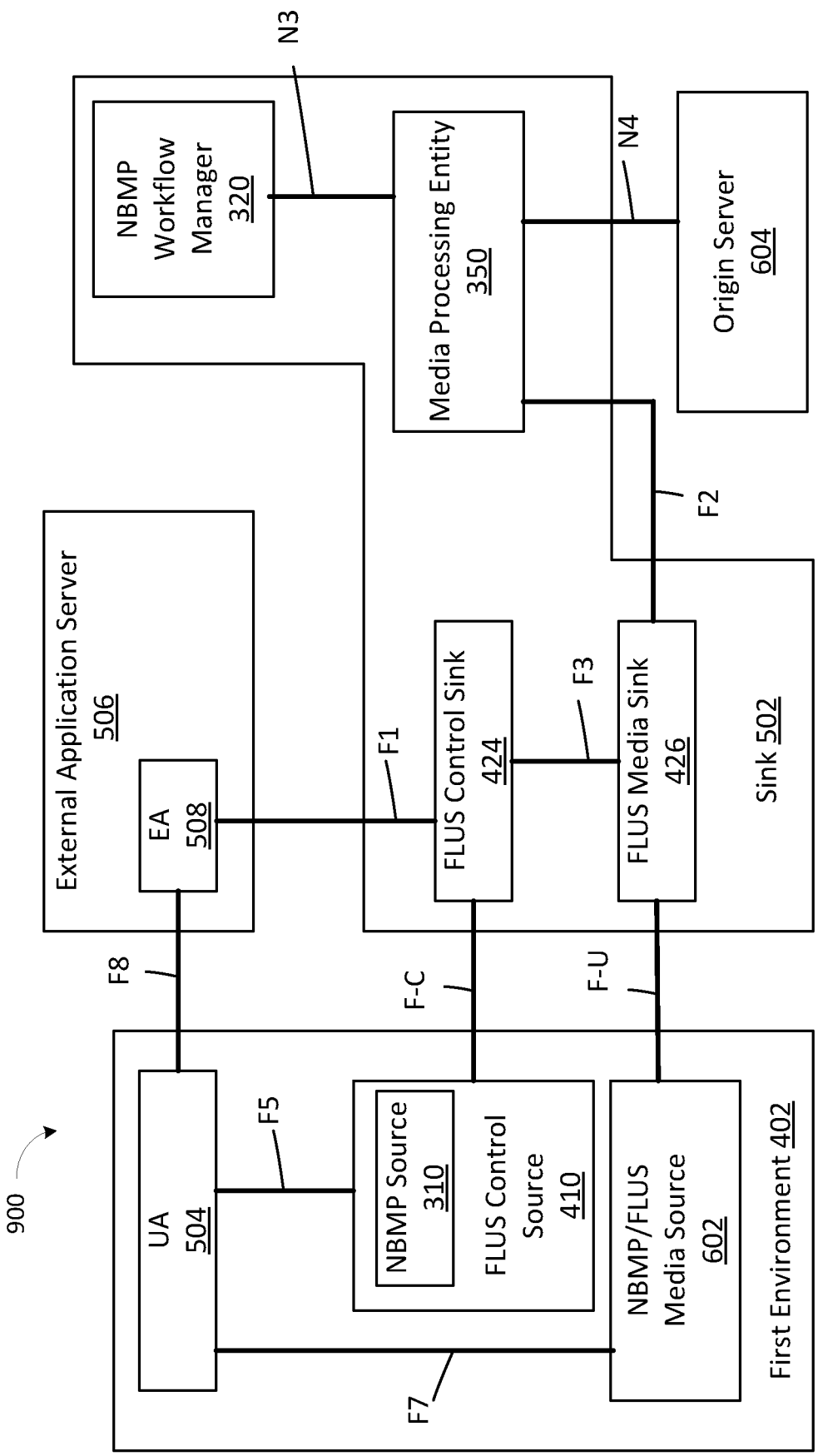
FIG. 9 is a block diagram of a network architecture, according to embodiments.

FIG. 9 illustrates an architecture 900 in which elements from architecture 500 of FIG. 5 are combined with elements from architecture 300 of FIG. 3. In order to avoid unnecessary duplication, redundant description has been omitted. As can be seen in FIG. 9, in architecture 900, FLUS control source 410 includes NBMP source 310, and sink 502 includes media processing entity 350 and NBMP workflow manager 320.

Referring to FIG. 9, an example of steps of establishing, operating, and tearing down a FLUS-NBMP session using architecture 900 may proceed as follows:
1. Application UA 504 makes a request through link F8 to application EA 508 to start a live session.
2. Application EA 508 retrieves the user profile and identifies the resources needed to run the service.
3. Application EA 508 requests the list of FLUS Sinks and their capabilities from Sink Discovery Server (not shown).
4. Application EA 508 picks a Sink 502 that can run the workflow in its MPE 350 and find its NBMP Workflow Manager 320 and Media Sink 426 address in the Sink capabilities.
5. Application EA 508 responds to UE with the full URL or a relative URL of the NBMP Workflow Manager 320 through FLUS Control Sink 424.
6. Application UA 504 requests FLUS Control Source 410 to establish the FLUS session.
7. FLUS Control Source 410 establishes the FLUS session and acknowledges application UA 504.
8. EA requests NBMP Source 310 start the workflow.
9. NBMP Source 310 builds WDD, and requests NBMP Workflow Manager 320 (directly or through FLUS Control Sink 424) to instantiate the Workflow
10. NBMP Workflow Manager 320 instantiates the workflow in the MPE 350.
11. NBMP Workflow Manager 320 responds to NBMP Source 310 with updated WDD.
12. NBMP Source 310 acknowledges workflow instantiation to application UA 504.
13. Application UA 504 start ingesting the content.
14. The session runs
15. Application UA 504 requests FLUS Control Source 410 to end the session.
16. NBMP Source 310 request NBMP Workflow Manager 320 to stop the workflow
17. FLUS Control Source 410 request to end the FLUS Session.

In the above, italicized text illustrates differences in the call-flow from the previous scenarios.

Table 4 shows the required standard interfaces in the scenario of FIG. 9:

TABLE 4

| NBMP Source in FLUS Control Source, NBMP Workflow Manager and MPE in Sink | | |
|---|---|---|
| Standard | FLUS | F-C*, F-U, F1 |
| | NBMP | N4 |

*With the support of NBMP Workflow Manager APIs

Table 5 shows a summary of deployment scenarios.

TABLE 5

| Summary of the deployment scenarios | | |
|---|---|---|
| Scenario | Standard | API |
| NBMP in Application Server (FIG. 6) | FLUS | F-C, F-U, F1 |
| | NBMP | N4, F2 |
| NBMP in Application Server, MPE in Sink (FIG. 7) | FLUS | F-C, F-U, F1 |
| | NBMP | N4, N3* |
| NBMP Source in Application Server, NBMP Workflow Manager, and MPE in Sink (FIG. 8) | FLUS | F-C, F-U, F1 |
| | NBMP | N2, N4 |
| NBMP Source in FLUS Control Source, NBMP Workflow Manager and MPE in Sink (FIG. 9) | FLUS | F-C **, F-U, F1 |
| | NBMP | N4 |

*N3 may be a closed API implemented by Application provider-operator agreement.
**With the support of NBMP Workflow Manager APIs Accordingly, embodiments may provide a method for deployment of the NBMP workflow management in 5G FLUS environment wherein 4 different scenarios is considered, including implementing a) NBMP in Application Server, b) NBMP in Application Server, MPE in Sink, c) NBMP Source in Application Server, and d) NBMP Workflow Manager and MPE in Sink NBMP Source in FLUS Control Source, NBMP Workflow Manager and MPE in Sink, wherein in each scenario the NBMP module may be implemented in a different module of the FLUS architecture, wherein for each scenario the APIs between NBMP and FLUS are defined, where APIs are divided to the APIs according to the NBMP standard, the APIs according to the 3GPP FLUS standard, the internal APIs for each module and the private APIs between the service provider and the operator.

Further, embodiments may provide methods including separate call flows for the establishment, management, and tears down of NBMP-FLUS joint session for each of the four scenarios above, wherein each case's call flow, an NBMP and a FLUS session are set up, where appropriate information is exchanged through the APIs defined above to establish and manage a joint session where the content is upstreamed from the device to the network using FLUS and then it is processed in a cloud or edge service using the NBMP standard.

In addition, embodiments may provide interfaces, workflow, and procedure for the discovery of the FLUS media network processing capabilities using 5G edge data architecture. This functionality allows the external application servers to learn about the current capabilities of the 5G network before requesting to set up network-based processing with FLUS.

The current 3GPP FLUS protocol supports including NBMP Workflow Description Document (WDD) as part of the session control update by the source device. However, it does not address the discovery of network processing capabilities of different edge servers for the FLUS service.

Figure 10:
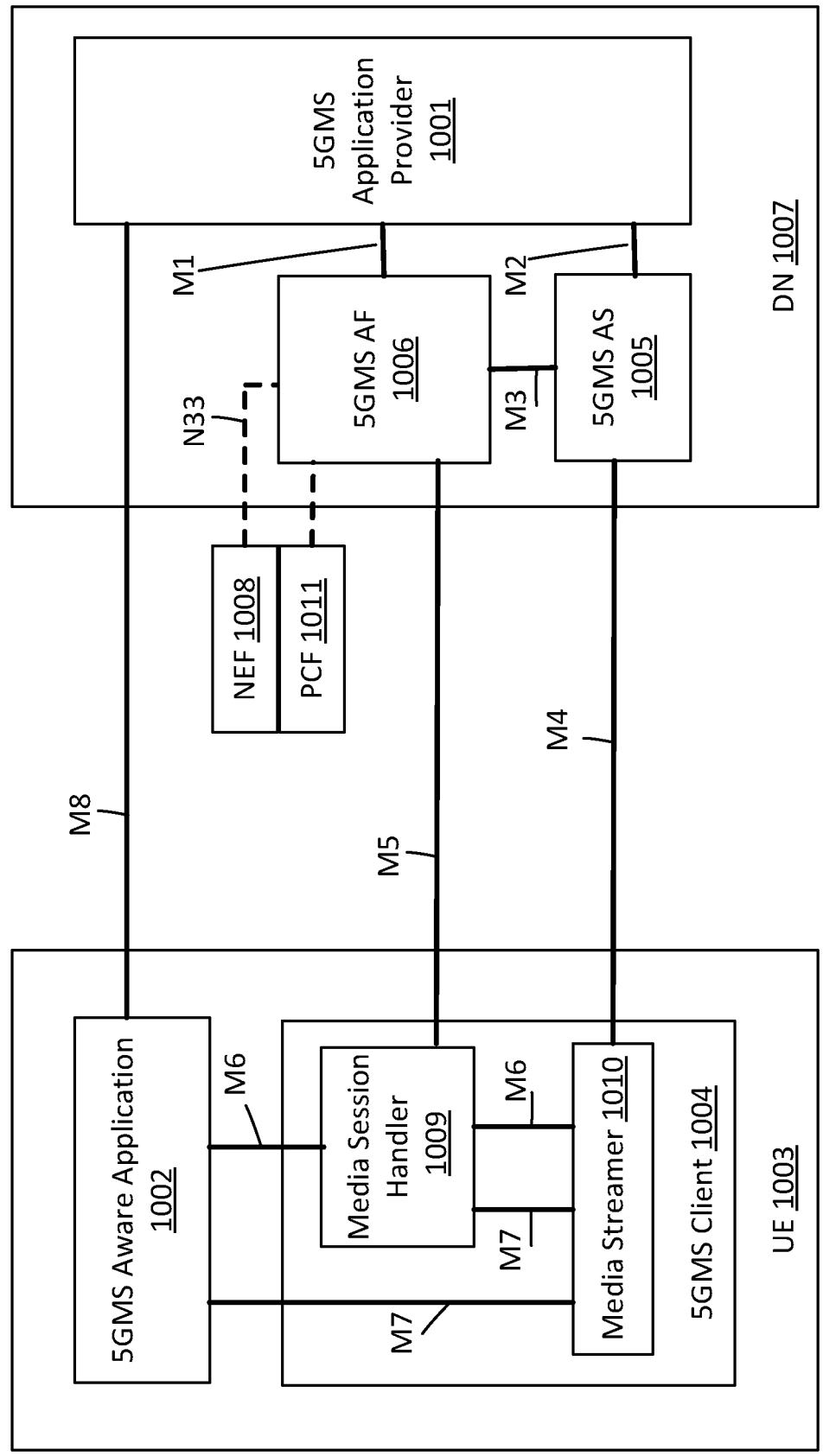
FIG. 10 is a block diagram of a network architecture, according to embodiments.

FIG. 10 is a diagram of a media architecture 1000 for media streaming. In embodiments, media architecture 1000 may be used for uplink streaming or downlink streaming. A 5G media streaming uplink (5GMS) Application Provider 1001 may use 5GMS for streaming services. 5GMS Application provider 1001 may provide a 5GMS Aware Application 1002 on the UE 1003 to make use of 5GMS Client 1004 and network functions using interfaces and APIs defined in 5GMS. 5GMS Application Server (AS) may be an AS dedicated to 5G Media Streaming. 5GMS Client 1004 may be a UE 1003 internal function dedicated to 5G Media Streaming.

5GMS Application Function (AF) 1006 and 5GMS AS 1005 may be Data Network (DN) 1007 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 1008 using link N33.

The media architecture 1000 may connect UE 1003 internal functions and related network functions for 5G Media Uplink Streaming. Accordingly, media architecture 1000 may include a number of functions. For example, 5GMS Client 1004 on UE 1003 may be an originator of 5GMS service that may be accessed through interfaces/APIs. 5GMS Client 1004 may include two sub-functions, media session handler (MSH) 1009 and media streamer 1010. MSH 1009 may communicate with the 5GMS AF 1006 in order to establish, control and support the delivery of a media session. The MSH 1009 may expose APIs that can be used by the 5GMS Aware Application 1002. Media Streamer 1010 may communicate with 5GMS AS 1005 in order to stream the media content and provide a service to the 5GMS Aware Application 1002 for media capturing and streaming, and the MSH 1009 for media session control. 5GMS Aware Application 1002 may control 5GMS Client 1003 by implementing external application or content service provider specific logic and enabling the establishment of a media session. 5GMS AS 1005 may host 5G media functions. 5GMS Application Provider 1001 may be an external application or content specific media functionality, e.g., media storage, consumption, transcoding and redistribution that uses 5GMS to stream media from 5GMS Aware Application 1002. 5GMS AF 1006 may provide various control functions to the MSH 1009 on the UE 1003 and/or to 5GMS Application Provider 1001. 5GMS AF 1006 may relay or initiate a request for different Policy or Charging Function (PCF) 1011 treatment or interact with other network functions.

Media architecture 1000 may include a number of different interfaces. For example, link M1 may be a 5GMS Provisioning API exposed by 5GMS AF 1006 to provision usage of media architecture 1000 and to obtain feedback. Link M2 may be a 5GMS Publish API exposed by 5GMS AS 1005 and used when 5GMS AS 1005 in trusted DN, such as DN 1007, is selected to receive content for streaming service. Link M3 may be an internal API used to exchange information for content hosting on 5GMS AS 1005 within a trusted DN such as DN 1007. Link M4 may be a Media Uplink Streaming API exposed by 5GMS AS 1023 to Media Streamer 1010 to stream media content. Link M5 may be a Media Session Handling API exposed by 5GMS AF 1005 to Media Session Handler for media session handling, control and assistance that also include appropriate security mechanisms e.g. authorization and authentication. Link M6 may be a UE 1003 Media Session Handling API exposed by MSH 1009 to 5GMS Aware Application 1002 to make use of 5GMS functions. Link M7 may be a UE Media Streamer API exposed by Media Streamer 1010 to 5GMS Aware Application 1002 and MSH 1009 to make use of Media Streamer 1010. Link M8 may be an Application API which is used for information exchange between 5GMS Aware Application 1002 and 5GMS Application Provider 1001, for example to provide service access information to the 5GMS Aware Application 1002.

Figure 11:
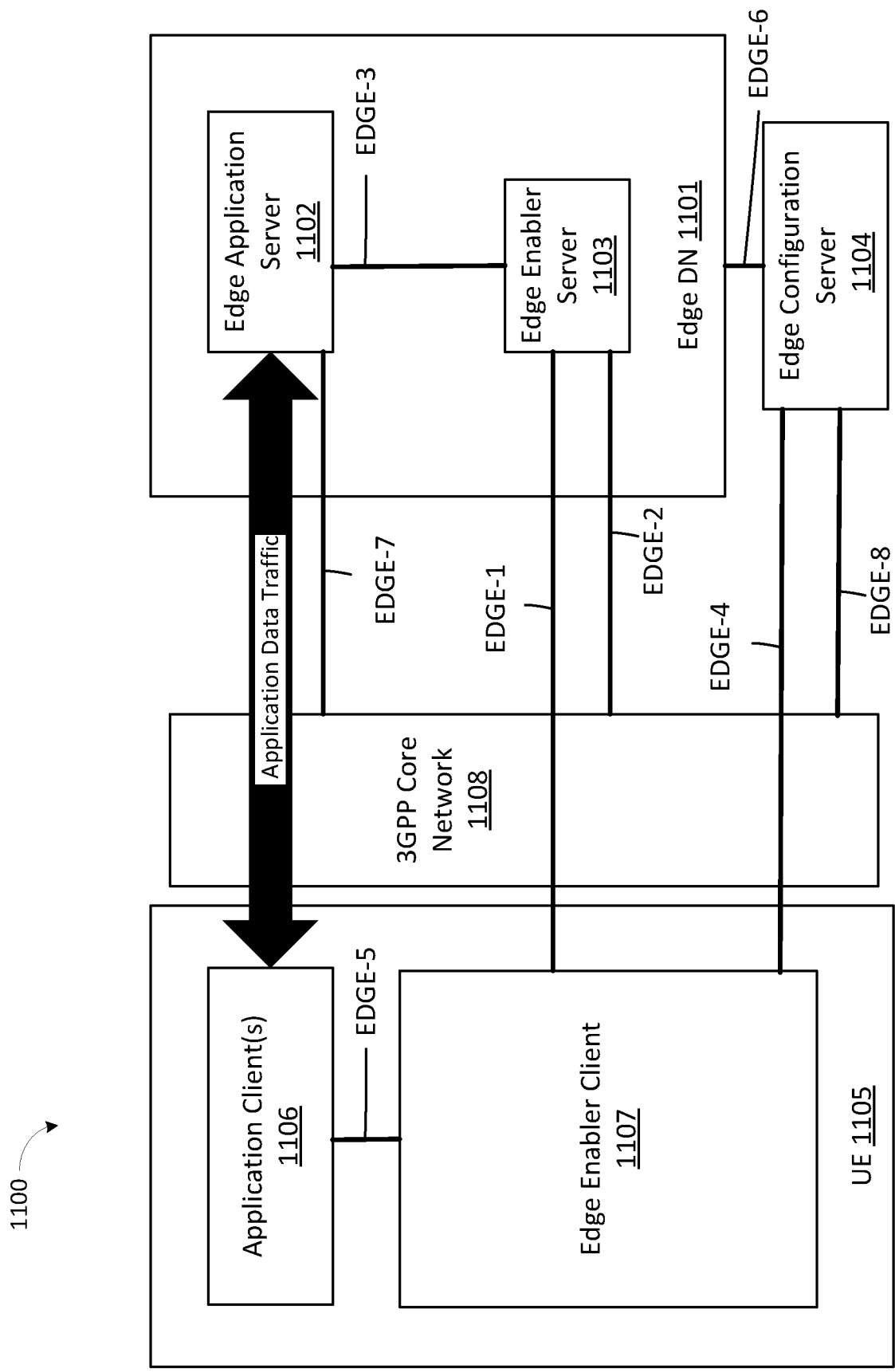
FIG. 11 is a block diagram of a network architecture, according to embodiments.

FIG. 11 is a diagram of a 5G edge network architecture 1100, according to embodiments. Edge Data Network (EDN) 1101 is a local Data Network. Edge Application Server (EAS) 1102 and Edge Enabler Server (EES) 1103 are contained within the EDN 1101. Edge Configuration Server (ECS) 1104 provides configurations related to EES 1103, including details of EDN 1101 hosting EES 1103. User Equipment (UE) 1105 contains Application Client (AC) 1106 and Edge Enabler Client (EEC) 1107. EAS 1102, EES 1103 and ECS 1104 may interact with the 3GPP Core Network 1108.

EES 1103 provides supporting functions needed for EAS 1102 and EEC 1107. Functionalities of EES 1103 may include: provisioning of configuration information to EEC 1107, enabling exchange of application data traffic with EAS; supporting the functionalities of API invoker and API exposing function, for example as specified in 3GPP TS 23.222; interacting with 3GPP Core Network 1108 for accessing the capabilities of network functions either directly (e.g. via PCF) or indirectly (e.g. via Service Capability Exposure Function (SCEF)/NEF/SCEF+NEF); supporting the functionalities of application context transfer; supporting external exposure of 3GPP network and service capabilities to EASs 1102 over link EDGE-3; supporting the functionalities of registration (i.e., registration, update, and de-registration) for EEC 1107 and EAS; and supporting the functionalities of triggering EAS 1102 instantiation on demand.

EEC 1107 provides supporting functions needed for AC. Functionalities of EEC 1107 may include: retrieval and provisioning of configuration information to enable the exchange of Application Data Traffic with EAS 1102; and discovery of EASs 1102 available in the EDN 1101.

ECS 1104 provides supporting functions needed for the EEC 1107 to connect with an EES 1103. Functionalities of ECS 1104 are: provisioning of Edge configuration information to the EEC 1107, for example the information for the EEC 1107 to connect to the EES 1103 (e.g. service area information applicable to LADN); and the information for establishing a connection with EESs 1103 (such as URI); supporting the functionalities of registration (i.e., registration, update, and de-registration) for the EES 1103; supporting the functionalities of API invoker and API exposing function as specified in 3GPP TS 23.222; and interacting with 3GPP Core Network 1108 for accessing the capabilities of network functions either directly (e.g. PCF) or indirectly (e.g. via SCEF/NEF/SCEF+NEF).

AC 1106 is the application resident in the UE 1105 performing the client function.

EAS 1102 is the application server resident in the EDN 1101, performing the server functions. The AC 1106 connects to EAS 1102 in order to avail the services of the application with the benefits of Edge Computing. It is possible that the server functions of an application are available only as an EAS 1102. However, it is also possible that certain server functions are available both at the edge and in the cloud, as an EAS 1102 and an Application Server resident in the cloud respectively. The server functions offered by an EAS 1102 and its cloud Application Server counterpart may be the same or may differ; if they differ, the Application Data Traffic exchanged with the AC may also be different. EAS 1102 may consume the 3GPP Core Network 1108 capabilities in different ways, such as: it may invoke 3GPP Core Network 1108 function APIs directly, if it is an entity trusted by the 3GPP Core Network 1108; it may invoke 3GPP Core Network 1108 capabilities through EES 1103; and it may invoke the 3GPP Core Network 1108 capability through the capability exposure functions i.e. SCEF or NEF.

Architecture 1100 may include a number of different interfaces for enabling edge applications, which may be referred to as reference points. For example, link EDGE-1 may be a reference point which enables interactions between the EES 1103 and the EEC 1107. It supports: registration and de-registration of EEC 1107 to EES 1103; retrieval and provisioning of EAS 1102 configuration information; and discovery of EASs 1102 available in the EDN 1101.

Link EDGE-2 may be a reference point which enables interactions between EES 1103 and the 3GPP Core Network 1108. It supports: access to 3GPP Core Network 1108 functions and APIs for retrieval of network capability information, e.g. via SCEF and NEF APIs as defined in 3GPP TS 23.501, 3GPP TS 23.502, 3GPP TS 29.522, 3GPP TS 23.682, 3GPP TS 29.122; or with EES 1103 deployed within the MNO trust domain (see 3GPP TS 23.501 clause 5.13, 3GPP TS 23.503, 3GPP TS 23.682). Link EDGE-2 may reuse 3GPP reference points or interfaces of EPS or 5GS considering different deployment models.

Link EDGE-3 may be a reference point which enables interactions between EES 1103 and EASs 1102. It supports: registration of EASs 1102 with availability information (e.g. time constraints, location constraints); de-registration of EASs 1102 from EES 1103; discovery of target EAS 1102 information to support application context transfer; providing access to network capability information (e.g. location information, Quality of Service (QoS) related information); and requesting the setup of a data session between AC and EAS 1102 with a specific QoS.

Link EDGE-4 may be a reference point which enables interactions between ECS 1104 and EEC 1107. It supports: provisioning of Edge configuration information to the EEC 1107.

Link EDGE-5 may be a reference point which enables interactions between AC and EEC 1107.

Link EDGE-6 may be a reference point which enables interactions between ECS 1104 and EES 1103. It supports: registration of EES 1103 information to ECS 1104.

Link EDGE-7 may be a reference point which enables interactions between EAS 1102 and the 3GPP Core Network 1108. It supports: access to 3GPP Core Network 1108 functions and APIs for retrieval of network capability information, e.g. via SCEF and NEF APIs as defined in 3GPP TS 23.501, 3GPP TS 23.502, 3GPP TS 29.522, 3GPP TS 23.682, 3GPP TS 29.122; or with EAS 1102 deployed within the MNO trust domain (see 3GPP TS 23.501 clause 5.13, 3GPP TS 23.682). Link EDGE-7 may reuse 3GPP reference points or interfaces of EPS or 5GS considering different deployment models.

Link EDGE-8 may be a reference point which enables interactions between the ECS 1104 and the 3GPP Core Network 1108. It supports: a) access to 3GPP Core Network 1108 functions and APIs for retrieval of network capability information, e.g. via SCEF and NEF APIs as defined in 3GPP TS 23.501, 3GPP TS 23.502, 3GPP TS 29.522, 3GPP TS 23.682, 3GPP TS 29.122; and with the ECS 1104 deployed within the MNO trust domain (see 3GPP TS 23.501 clause 5.13, 3GPP TS 23.682). Link EDGE-8 may reuse 3GPP reference points or interfaces of EPS or 5GS considering different deployment models.

Figure 12:
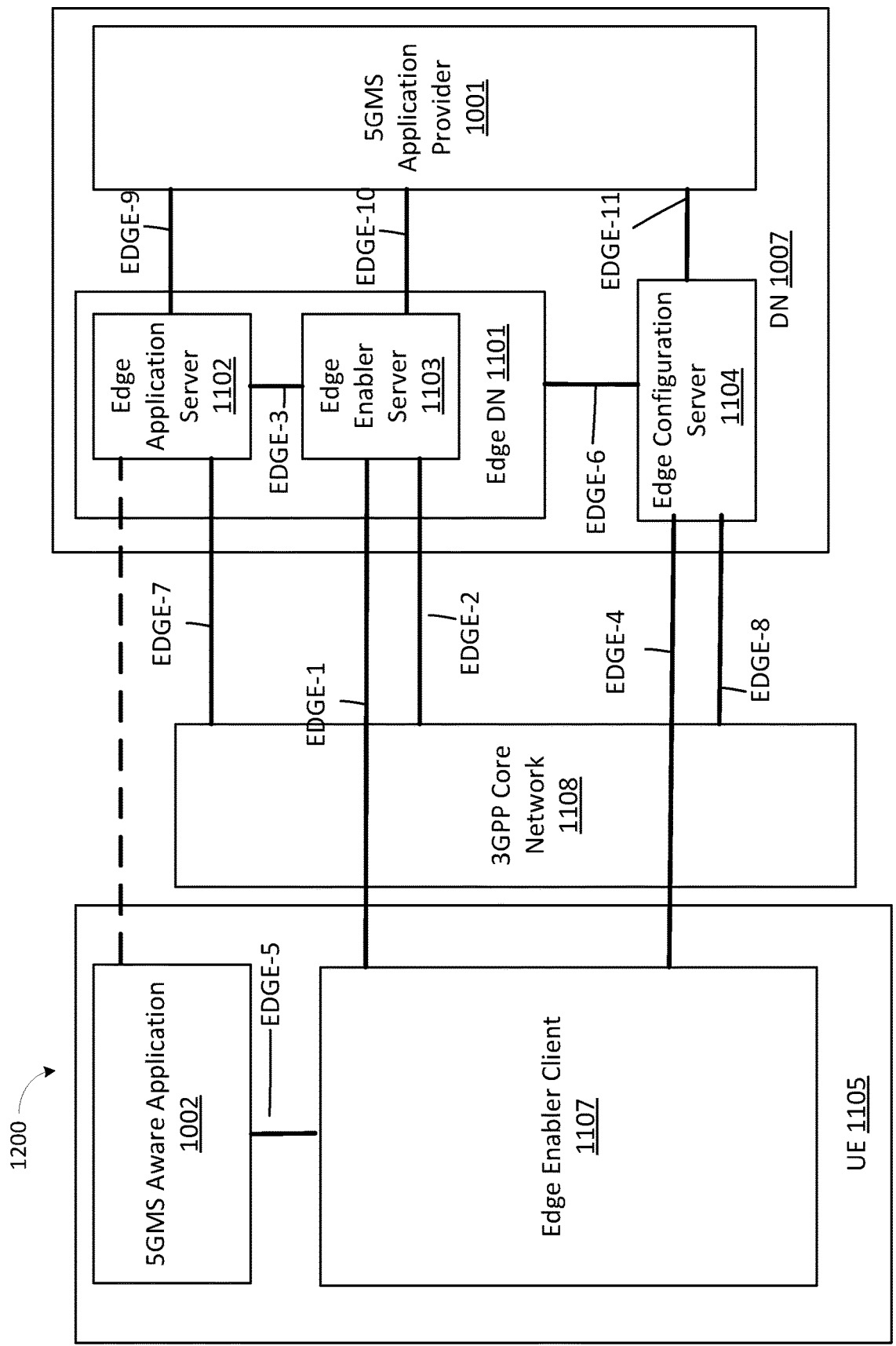
FIG. 12 is a block diagram of a network architecture, according to embodiments.

FIG. 12 illustrates an architecture 1200 in which elements from architecture 1100 of FIG. 11 are combined with elements from architecture 1000 of FIG. 10. In order to avoid unnecessary duplication, redundant description has been omitted.

As shown in FIG. 12, link EDGE-9 allows communication between EAS 1102 and 5GMS AP 1001, link EDGE-10 allows communication between EES 1103 and 5GMS AP 1001, and link EDGE-11 allows communication between ECS 1104 and 5GMS AP 1001.

Figure 13:
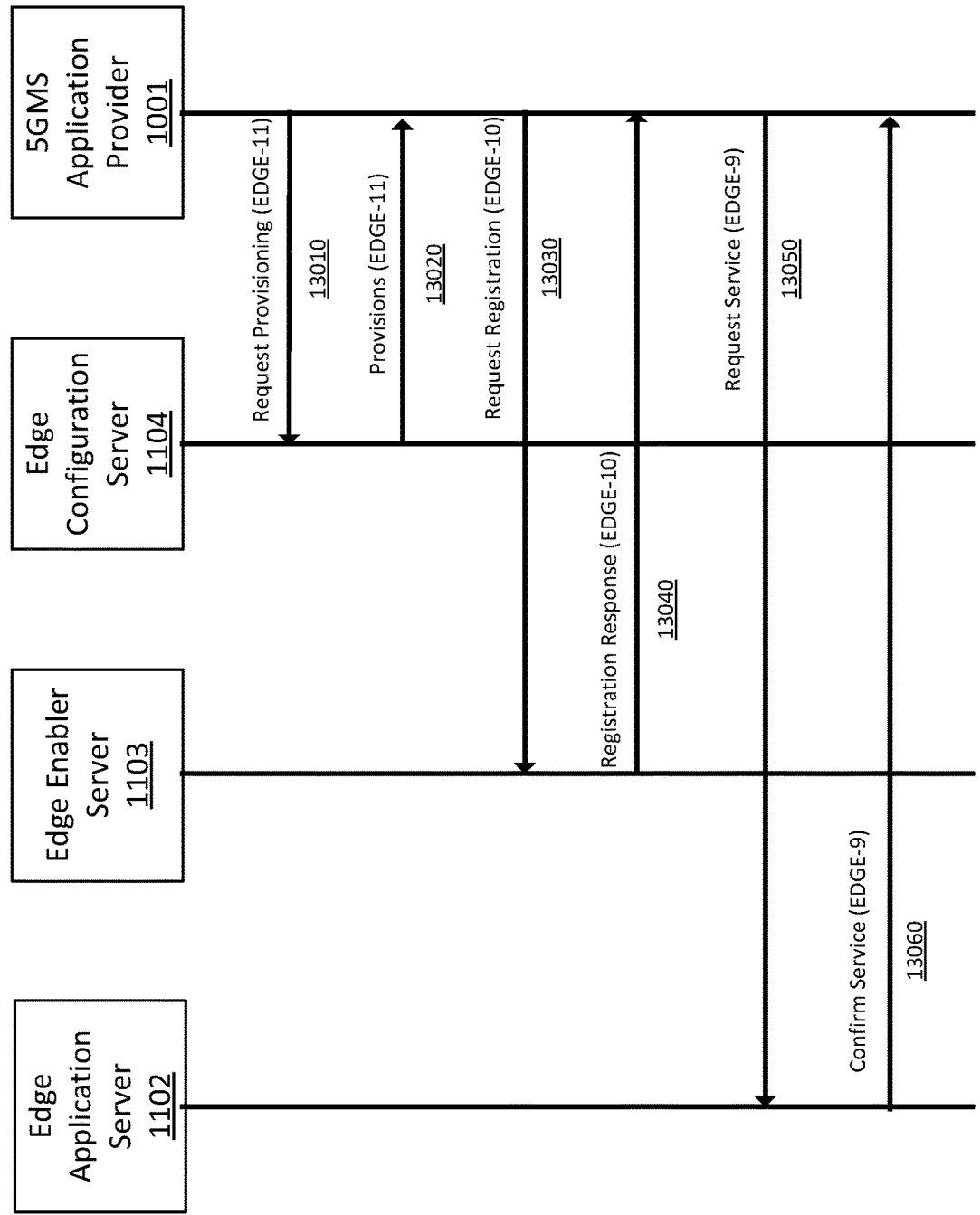
FIG. 13 is a block diagram illustrating an example process for network capability discovery, according to embodiments.

FIG. 13 illustrates a process 1300 which may relate to a call flow for discovering Edge Data Network 1101 capabilities. Process 1300 may be performed using architecture 1200, architecture 1000 discussed below, or any other architecture as desired.

Process 1300 may extend the TS23.558 APIs to enable the discovery of media capabilities of the Edge Data networks by the 5GMS AP 1001.

According to process 1300, at operation 13010, 5GMS AP 1001 may send a request for provisioning to ECS 1104 using link EDGE-11. At operation 13020, ECS 1104 provisions and provides a list of EESs 1103 to 5GMS AP 1001 using link EDGE-11. At operation 13030, 5GMS AP 1001 requests registration from an EES 1103 included in the list of EESs 1103 using link EDGE-10. At operation 13040, EES 1103 registers and provides a list and locations of EASs 1102 to 5GMS AP 1001 using link EDGE-10. At operation 13050, 5GMS AP 1001 may request a service from an EAS 1102 included in the list of EASs 1102 using link EDGE-9. At operation 13050, EAS 1102 starts running the service and confirms the service to 5GMS AP 1001 using link EDGE-9, and 5GMS AP 1001 connects to EAS 1102 and uses the service.

Figure 14:
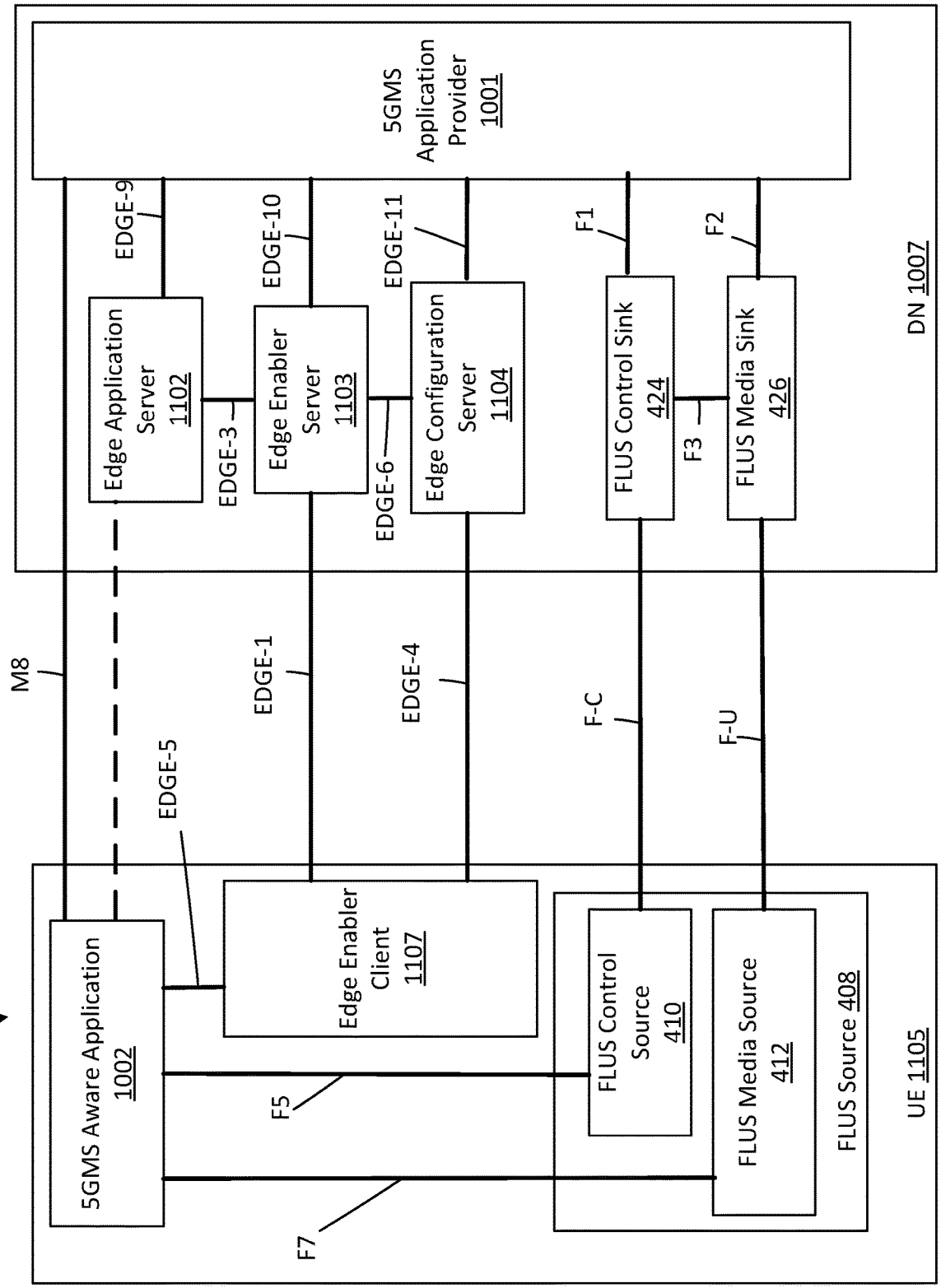
FIG. 14 is a block diagram of a network architecture, according to embodiments.

FIG. 14 illustrates an architecture 1400 in which elements from architecture 500 of FIG. 5 are combined with elements from architecture 1200 of FIG. 12. In order to avoid unnecessary duplication, redundant description has been omitted. As can be seen in FIG. 14, in architecture 1400, UE 1105 includes FLUS source 408, FLUS control source 410, and FLUS media source 412, and DN 1007 includes FLUS control sink 7424 and FLUS media sink 426.

In the example architecture 1400 shown in FIG. 14 and elsewhere in the present disclosure, FLUS Control Sink 424 and FLUS Media Sink 426 as well as ECS 1104 and EES 1103 are logical entities. All or some of them may be combined when implemented. In addition, EASs 1102 are multiple entities. From FLUS point of view, all EAS 1102 entities are part of the 5GMS Application Provider 1001. F2 provides the media flow between FLUS Sink and 5GMS Application Provider 1001. Because (a part of) the application may be run on an EAS 1102, FLUS Media Sink 426 may be connected to the EAS 1102 through 5GMS Application Provider 1001.

In embodiments, the 5GMS Application Provider 1001 may discover the list and location of the Edge Application Servers 1102 directly.

In embodiments, the 5GMS Application Provider 1001 may discover the Edge Application's capabilities directly.

In embodiments, the 5GMS Application Provider 1001 may request service(s) from Edge Application Server 1102 directly and instantiate and use those services.

In embodiments, the 5GMS Application Provider 1001 doesn't need to go through the UE 1105 to perform any above functions.

In embodiments, the same resources that UE 1105 uses to communicate with the Edge Data Network 1007 can be used by the 5GMS Application Provider 1001 and no new resources are needed.

In embodiments, the 5G edge architecture is combined with FLUS architecture, providing a mechanism to set up media services on edge servers and providing a media flow between FLUS and Edge Application Server(s).

Accordingly, embodiments may provide a method of combining 5G edge data network and FLUS, wherein the two architecture are combined and control and data flow are arranged such that part of the media application may be run on an Edge Application Server and the session can be established using the standard processes of 5G edge networks and FLUS architecture.

Figure 15:
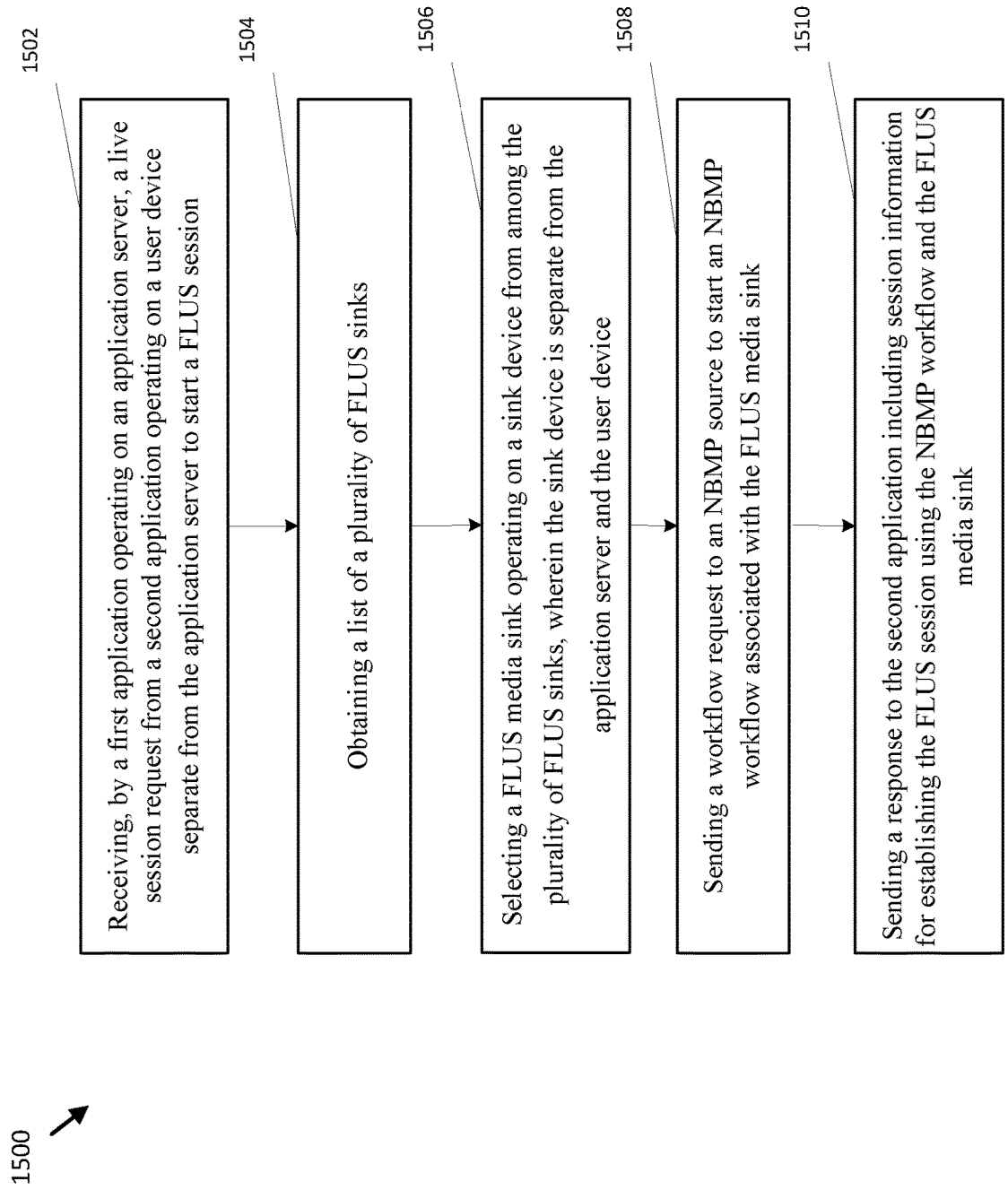
FIG. 15 is a flowchart of an example process for managing capabilities of a media streaming network, according to embodiments.

FIG. 15 is a flowchart is an example process 1500 for processing media content in Moving Picture Experts Group (MPEG) Network Based Media Processing (NBMP). In some implementations, one or more process blocks of FIG. 15 may be performed by one or more elements of any of the systems or architectures discussed above.

As shown in FIG. 15, process 1500 may include receiving, by a first application operating on an application server, a live session request from a second application operating on a user device separate from the application server to start a Framework for Live Uplink Streaming (FLUS) session (block 1502). In embodiments, the user device may correspond to the first environment 402, and the application server may correspond to external application server 506.

As further shown in FIG. 15, process 1500 may include obtaining a list of a plurality of FLUS sinks (block 1504).

As further shown in FIG. 15, process 1500 may include selecting a FLUS media sink operating on a sink device from among the plurality of FLUS sinks, wherein the sink device is separate from the application server and the user device (block 1506). In embodiments, the FLUS media sink may correspond to FLUS media sink 426, and the sink device may correspond to sink 502.

As further shown in FIG. 15, process 1500 may include sending a workflow request to an NBMP source to start an NBMP workflow associated with the FLUS media sink (block 1508). In embodiments, the NBMP source may correspond to NBMP source 310.

As further shown in FIG. 15, process 1500 may include sending a response to the second application including session information for establishing the FLUS session using the NBMP workflow and the FLUS media sink (block 1500).

In embodiments, the application server may include the NBMP source, an NBMP workflow manager, and at least one media processing entity, the sink device may include a FLUS control sink, and the user device may include a FLUS control source and a FLUS media source. In embodiments, the NBMP workflow manager may correspond to NBMP workflow manager 320, the at least one media processing entity may correspond to media processing entity 350, the FLUS control sink may correspond to FLUS control sink 424, the FLUS control source may correspond to FLUS control source 410, and the FLUS media source may correspond to one or more of NBMP media source 360, FLUS media source 412 and NBMP/FLUS media course 602.

In embodiments, a workflow description document corresponding to the NBMP workflow may be constructed by the NBMP source and instantiated by the NBMP workflow manager, and wherein the session information may include sink control information corresponding to the FLUS control sink and media sink information corresponding to the FLUS media sink.

In embodiments, the application server may include the NBMP source and the NBMP workflow manager, the sink device may include the FLUS control sink and the at least one media processing entity, and the user device may include the FLUS control source and the FLUS media source.

In embodiments, the FLUS media sink may be selected based on a capability of the at least one media processing entity, the workflow request may include address information of the FLUS media sink, a workflow description document corresponding to the NBMP workflow may be constructed by the NBMP source and instantiated by the NBMP workflow manager in the at least one media processing entity, and the session information may include sink control information corresponding to the FLUS control sink and media sink information corresponding to the FLUS media sink.

In embodiments, the application server may include the NBMP source, the sink device may include the FLUS control sink, the NBMP workflow manager, and the at least one media processing entity, and the user device may include the FLUS control source and the FLUS media source.

In embodiments the FLUS media sink may be selected based on a capability of the at least one media processing entity, the workflow request may include address information of the FLUS media sink, a workflow description document corresponding to the NBMP workflow is constructed by the NBMP source and instantiated by the NBMP workflow manager in the at least one media processing entity, and the session information may include sink control information corresponding to the FLUS control sink and media sink information corresponding to the FLUS media sink.

In embodiment, the sink device may include the FLUS control sink, the NBMP workflow manager, and the at least one media processing entity, and the user device may include the FLUS control source, the FLUS media source, and the NBMP source.

In embodiments, a workflow description document corresponding to the NBMP workflow may be constructed by the NBMP source and instantiated by the NBMP workflow manager, and the session information may include address information of the NBMP workflow manager.

In embodiments, the user device may include an edge enabler client. In embodiments, the edge enabler client may correspond to edge enabler client 1107.

Although FIG. 15 shows example blocks of process 1500, in some implementations, process 1500 may include additional blocks, fewer blocks, different blocks, or differently arranged blocks than those depicted in FIG. 15. Additionally, or alternatively, two or more of the blocks of process 1500 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of processing media content in Moving Picture Experts Group (MPEG) Network Based Media Processing (NBMP), the method being performed by at least one processor, and the method comprising:
  receiving, by a first application operating on an application server from a second application operating on a user device, a live session request to start a Framework for Live Uplink Streaming (FLUS) session, wherein the application server comprises the first application, a NBMP source, and a NBMP workflow manager;
  obtaining a list of a plurality of FLUS sinks;
  selecting a FLUS media sink from among the plurality of FLUS sinks; and
  sending a response to the second application including session information for establishing the FLUS session based on a NBMP workflow request, wherein the session information comprises control sink information and media sink information.

2. The method of claim 1, wherein the FLUS media sink operates on a sink device,
  wherein the sink device includes a FLUS control sink, and
  wherein the user device includes a FLUS control source and a FLUS media source.

3. The method of claim 2, wherein a workflow description document corresponding to the NBMP workflow request is constructed by the NBMP source and instantiated by the NBMP workflow manager.

4. The method of claim 1, wherein the FLUS media sink operates on a sink device,
  wherein the sink device includes a FLUS control sink and at least one media processing entity, and
  wherein the user device includes a FLUS control source and a FLUS media source.

5. The method of claim 4, wherein the FLUS media sink is selected based on a capability of the at least one media processing entity,
  wherein the NBMP workflow request includes address information of the FLUS media sink,
  wherein a workflow description document corresponding to the NBMP workflow request is constructed by the NBMP source and instantiated by the NBMP workflow manager in the at least one media processing entity, and
  wherein the session information includes the control sink information corresponding to the FLUS control sink and the media sink information corresponding to the FLUS media sink.

6. The method of claim 1, wherein the user device includes a FLUS control source and a FLUS media source.

7. The method of claim 6, wherein the FLUS media sink is selected based on a capability of at least one media processing entity,
  wherein the NBMP workflow request includes address information of the FLUS media sink,
  wherein a workflow description document corresponding to the NBMP workflow request is constructed by the NBMP source and instantiated by the NBMP workflow manager in the at least one media processing entity, and
  wherein the session information includes the control sink information corresponding to a FLUS control sink and the media sink information corresponding to the FLUS media sink.

8. The method of claim 1, wherein the FLUS media sink operates on a sink device, wherein the sink device includes a FLUS control sink, another NBMP workflow manager, and at least one media processing entity, and
   wherein the user device includes a FLUS control source, a FLUS media source, and the NBMP source.

9. The method of claim 8, wherein a workflow description document corresponding to the NBMP workflow request is constructed by the NBMP source and instantiated by the NBMP workflow manager, and
   wherein the session information includes address information of the NBMP workflow manager.

10. The method of claim 1, wherein the user device includes an edge enabler client.

11. An apparatus for processing media content in Moving Picture Experts Group (MPEG) Network Based Media Processing (NBMP), the apparatus comprising:
   at least one memory configured to store program code; and
   at least one processor configured to read the program code and operate as instructed by the program code, the program code comprising:
   receiving code configured to cause the at least one processor to receive, by a first application operating on an application server from a second application operating on a user device, a live session request to start a Framework for Live Uplink Streaming (FLUS) session, wherein the application server comprises the first application, a NBMP source, and a NBMP workflow manager;
   obtaining code configured to cause the at least one processor to obtain a list of a plurality of FLUS sinks;
   selecting code configured to cause the at least one processor to select a FLUS media sink from among the plurality of FLUS sinks; and
   first sending code configured to cause the at least one processor to send a response to the second application including session information for establishing the FLUS session based on a NBMP workflow request, wherein the session information comprises control sink information and media sink information.

12. The apparatus of claim 11, wherein the FLUS media sink operates on a sink device,
   wherein the sink device includes a FLUS control sink, and
   wherein the user device includes a FLUS control source and a FLUS media source.

13. The apparatus of claim 12, wherein a workflow description document corresponding to the NBMP workflow request is constructed by the NBMP source and instantiated by the NBMP workflow manager.

14. The apparatus of claim 11, wherein the FLUS media sink operates on a sink device,
   wherein the sink device includes a FLUS control sink and at least one media processing entity, and
   wherein the user device includes a FLUS control source and a FLUS media source.

15. The apparatus of claim 14, wherein the FLUS media sink is selected based on a capability of the at least one media processing entity,
   wherein the NBMP workflow request includes address information of the FLUS media sink,
   wherein a workflow description document corresponding to the NBMP workflow request is constructed by the NBMP source and instantiated by the NBMP workflow manager in the at least one media processing entity, and
   wherein the session information includes the control sink information corresponding to the FLUS control sink and the media sink information corresponding to the FLUS media sink.

16. The apparatus of claim 11, wherein the user device includes a FLUS control source and a FLUS media source.

17. The apparatus of claim 16, wherein the FLUS media sink is selected based on a capability of at least one media processing entity,
   wherein the NBMP workflow request includes address information of the FLUS media sink,
   wherein a workflow description document corresponding to the NBMP workflow request is constructed by the NBMP source and instantiated by the NBMP workflow manager in the at least one media processing entity, and
   wherein the session information includes the control sink information corresponding to a FLUS control sink and the media sink information corresponding to the FLUS media sink.

18. The apparatus of claim 11, wherein the FLUS media sink operates on a sink device, wherein the sink device includes a FLUS control sink, another NBMP workflow manager, and at least one media processing entity, and
   wherein the user device includes a FLUS control source, a FLUS media source, and the NBMP source.

19. The apparatus of claim 18, wherein a workflow description document corresponding to the NBMP workflow request is constructed by the NBMP source and instantiated by the NBMP workflow manager, and
   wherein the session information includes address information of the NBMP workflow manager.

20. A non-transitory computer-readable medium storing instructions that, when executed by at least one processor of an apparatus for processing media content in Moving Picture Experts Group (MPEG) Network Based Media Processing (NBMP), cause the at least one processor to:
   receive, by a first application operating on an application server from a second application operating on a user device, a live session request to start a Framework for Live Uplink Streaming (FLUS) session, wherein the application server comprises the first application, a NBMP source, and a NBMP workflow manager;
   obtain a list of a plurality of FLUS sinks;
   select a FLUS media sink from among the plurality of FLUS sinks; and
   send a response to the second application including session information for establishing the FLUS session based on a NBMP workflow request, wherein the session information comprises control sink information and media sink information.

* * * * *